(12) United States Patent
Matheson et al.

(10) Patent No.: US 12,304,325 B2
(45) Date of Patent: May 20, 2025

(54) POWER SYSTEM CONTROLLER FAILSAFE CYCLING PROTECTION

(71) Applicant: The Boeing Company, Chicago, IL (US)

(72) Inventors: Evelyn M. Matheson, Bothell, WA (US); Daniel D. Church, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 358 days.

(21) Appl. No.: 17/399,757

(22) Filed: Aug. 11, 2021

(65) Prior Publication Data

US 2022/0048393 A1    Feb. 17, 2022

Related U.S. Application Data

(60) Provisional application No. 63/064,397, filed on Aug. 11, 2020.

(51) Int. Cl.
*B60L 3/00* (2019.01)
*B60L 3/04* (2006.01)
*B64D 31/00* (2006.01)

(52) U.S. Cl.
CPC ............... *B60L 3/04* (2013.01); *B64D 31/00* (2013.01); *B60L 2200/10* (2013.01)

(58) Field of Classification Search
CPC ........ B60L 3/04; B60L 2200/10; B60L 3/003; B60L 3/0084; B64D 31/00; B64D 41/00; B64D 2221/00; H02J 2310/44
See application file for complete search history.

(56) References Cited

U.S. PATENT DOCUMENTS 5,400,205 A * 3/1995 Ligon ................... H02H 7/266
361/65
5,715,124 A * 2/1998 Votava ................... H02H 7/062
361/115

(Continued)

FOREIGN PATENT DOCUMENTS

CN    110667866 A * 1/2020 ............. B64D 47/00

OTHER PUBLICATIONS

Machine Translation of CN110667866A (Year: 2020).*

(Continued)

*Primary Examiner* — Anne Marie Antonucci
*Assistant Examiner* — Jordan T Smith
(74) *Attorney, Agent, or Firm* — Harrity & Harrity, LLP

(57) ABSTRACT

Examples provide a method and system for inhibiting aircraft electrical power system controller failsafe state cycling in air mode condition. The electrical power system controller can include a bus power control unit (BPCU) or a generator control unit (GCU). A failsafe cycling protection indicator, such as a software flag or hardware electronic latch has a first configuration to indicate failsafe cycling protection is enabled and a second configuration to indicate failsafe cycling protection is disabled. An internal low voltage power source generates an output voltage. If a monitor component monitoring the output voltage detects an undervoltage or overvoltage, the aircraft electrical power system controller goes into a failsafe state. A failsafe cycling component prevents the aircraft electrical power system controller from exiting the failsafe state if the failsafe cycling protection is enabled.

20 Claims, 16 Drawing Sheets

(56) References Cited

U.S. PATENT DOCUMENTS

| | | | | |
|---|---|---|---|---|
| 2013/0270918 | A1* | 10/2013 | Novakovic | H02J 3/02 |
| | | | | 307/80 |
| 2014/0277882 | A1* | 9/2014 | Isayeva | B60L 3/003 |
| | | | | 903/903 |
| 2014/0362480 | A1* | 12/2014 | Veil | B25J 9/1674 |
| | | | | 361/18 |
| 2019/0084425 | A1* | 3/2019 | Liu | B60L 3/0092 |
| 2020/0076184 | A1* | 3/2020 | Belisle | H02H 9/045 |
| 2023/0396061 | A1* | 12/2023 | Aicher | H02J 9/061 |

OTHER PUBLICATIONS

Analog Devices LTC4365 Data Sheet, "Overvoltage, Undervoltage and Reverse Supply Protection Controller", Rev. B, Sep. 2019, (c) Analog Devices, Inc. 2013-2019, 20 pages, downloaded from: https://www.analog.com/media/en/technical-documentation/ data-sheets/LTC4365.pdf (Year: 2019).*

\* cited by examiner

POWER SYSTEM CONTROLLER FAILSAFE CYCLING PROTECTION

CROSS-REFERENCE TO RELATED APPLICATION

This application claims the benefit of and priority to U.S. Provisional Application No. 63/064,397, entitled "POWER SYSTEM CONTROLLER FAILSAFE CYCLING PROTECTION," filed on Aug. 11, 2020, the disclosure of which is incorporated by reference herein in its entirety.

BACKGROUND

Aircraft electrical power system controllers, such as, but not limited to, a bus power control unit (BPCU) and/or a generator control unit (GCU), regulate and distribute power around aircraft. As a form of protection, software and hardware circuitry within the electrical power system controller monitors the low voltage power supply (LVPS) output voltages and reacts to undervoltage and overvoltage conditions of any LVPS output by shutting down the controller to a failsafe state. The failsafe state is a shutdown or sleep/dormant state, in which the controller is no longer operating in normal mode. The failsafe state may also be referred to as failsafe mode, sleep mode, or a non-operational mode. Controllers recover from the failsafe state by monitoring for a manually initiated action, such as a specific flight deck switch actuation or cycling of the input power to the controller.

In some systems, automatic recovery from the failsafe state can occur in a controller if the fault is intermittent and low voltage output recovers, which looks like a controller recovery without any flight deck switch actuation or removal of the input power to the LVPS. This can result in the controller attempting to recover from failsafe without a manual operation, such as flight deck action. Frequent and random cycling of a controller into and out of the failsafe state due to LVPS output voltage toggling inside and outside of the failsafe trigger threshold band can potentially result in undesirable power loss of varying duration and frequency to power buses and downstream load equipment, as well as possible random duration of voltage transients.

SUMMARY

The disclosed examples are described in detail below with reference to the accompanying drawing figures listed below. The following summary is provided to illustrate implementations disclosed herein. It is not meant, however, to limit all examples to any particular configuration or sequence of operations.

Some aspects and implementations disclosed herein are directed at an electrical power system controller. The controller includes a failsafe cycling protection indicator indicating whether failsafe cycling protection is enabled or disabled. A low voltage power source (LVPS) generates an output voltage. If the output voltage falls outside an acceptable threshold range, the controller switches from a normal operating state to a failsafe state. A failsafe cycling component prevents the controller from returning to the operating state from the failsafe state at power up if the controller detects the aircraft is in air mode and failsafe cycling protection is enabled.

The features, functions, and advantages that have been discussed are achieved independently in various implementations or are to be combined in yet other implementations, further details of which are seen with reference to the following description and drawings.

BRIEF DESCRIPTION OF THE DRAWINGS

Corresponding reference characters indicate corresponding parts throughout the drawings.

DETAILED DESCRIPTION

Figure 1:
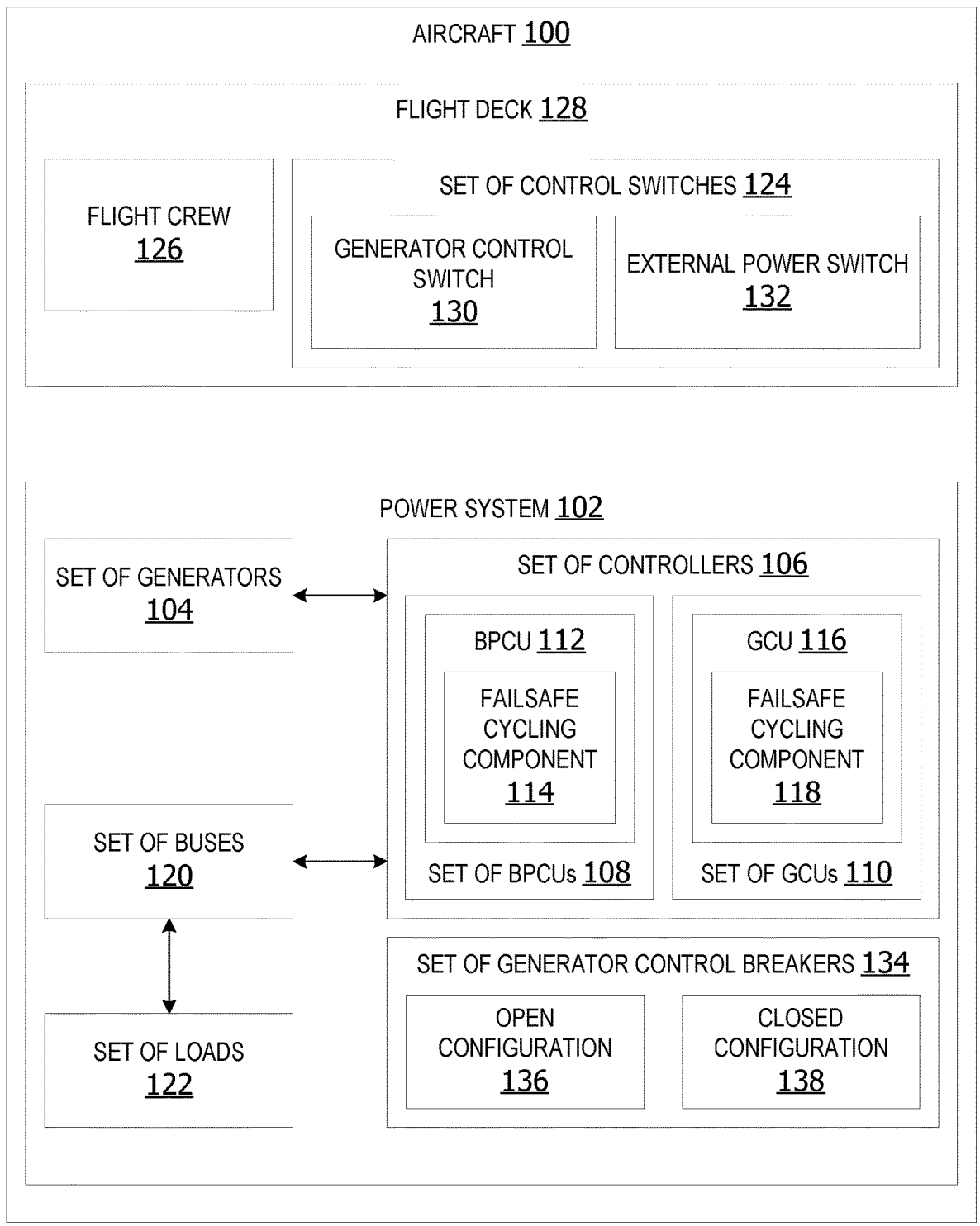
FIG. 1 is a block diagram illustrating an aircraft including power system controller cycling protection according to an implementation.

The various implementations will be described in detail with reference to the accompanying drawings. Wherever possible, the same reference numbers will be used throughout the drawings to refer to the same or like parts. References made throughout this disclosure relating to specific implementations and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to "one implementation" are not intended to be interpreted as excluding the existence of additional implementations that also incorporate the recited features. Moreover, unless explicitly stated to the contrary, implementations "comprising" or "having" an element or a plurality of elements having a particular property could include additional elements not having that property.

Various examples will now be described in connection with an aircraft electrical power system controller having an internal power supply with multiple internal operating voltages. Undervoltage and overvoltage is monitored based on hysteresis to shutdown the controller into a failsafe state and keep the controller shut down due to hard voltage regulation failures.

Hysteresis levels associated with the undervoltage/overvoltage protection react to allow the controller, such as a bus power control unit (BPCU) or generator control unit (GCU) to enter into and recover out of a failsafe state. As a result, automatic recovery occurs if the fault is intermittent and low voltage output recovers, without any flight deck switch actuation or removal of the 28 Volt (V) direct current (dc) input power to the power system controller. This allows for random and frequent cycling of a BPCU or GCU into and out of a failsafe state, for LVPS failure modes that result in the output voltage toggling inside and outside of the hysteresis band. The present disclosure provides additional protections when using undervoltage/overvoltage hysteresis thresholds to prevent failsafe cycling with respect to possible intermittent failure modes of an LVPS.

In other words, with the examples described herein, the controller LVPS protections do not assume a hard failure based on the above discussed conditions, but instead an intermittent fault. The systems and methods described herein monitor and consider other factors in addition to a voltage threshold to make a decision to enter into or recover from failsafe. As a result, failure modes associated with intermittent faults of the LVPS do not result in un-intended recovery of the BPCU and GCU from a failsafe state, without manual action. That is, the BPCU or GCU recover from a failsafe state by an actual power cycling and/or a manual action taken by the flight crew or a maintenance technician on the ground (button push on flight deck).

One or more output voltages of the LVPS can toggle between a normal operating range and a failsafe shutdown threshold randomly and possibly multiple times within a short period (e.g., such as many times in an airplane flight leg). This can result in the entire BPCU or GCU entering in and out of a failsafe state. The airplane system level result of a BPCU or GCU toggling in and out of a failsafe state can result in unpredictable and undesirable effects causing multiple power interrupts to aircraft electrical buses of varying duration and with random intervals between successive interrupts.

Some examples described herein provide a failsafe cycling protection component that is implemented as part of the power-up sequence of the affected electrical power system controllers. The failsafe cycling protection allows recovery of airplane electrical power system controllers in a deterministic and predictable manner which prevents on and off cycling behavior that would otherwise lead to out-of-tolerance system behavior and anomalous performance by aircraft load equipment.

Other examples provide a failsafe cycling component implemented within the BPCU and GCU software, to prevent undesirable cycling or toggling behavior in and out of a failsafe state. The failsafe cycling component only allows BPCU or GCU recovery from a failsafe state in a predictable and intentional manner. The method is designed to inhibit cycling behavior while the airplane is in an air mode condition, thereby preventing undesirable airplane level effects. The failsafe cycling component allows the power cycling behavior when the aircraft is on the ground, so as to prevent creating new issues with regular airplane troubleshooting and maintenance activities that involve turning on and off power to BPCU/GCU controllers.

In some examples, an internal parameter recorded in the non-volatile (internal) memory (NVM) indicates whether failsafe cycling protection should be enabled when the controller powers up. The term "power up" or "powers up" refers to the power or voltage level within the controller falling within an acceptable threshold range. The failsafe cycling protection utilizes information from internal memory and direct monitored input signals. In this manner, the system does not rely on coordination or communication with outside equipment or systems. This reduces network usage, ensures reliance on high fidelity information, and improves efficiency of anti-cycling behavior.

In other examples, the failsafe cycling protection is enabled when the airplane is in an air mode or engines are running. This prevents the anti-cycling protection from causing nuisance issues with troubleshooting fault messages or installation of new controllers with maintenance operations during airplane production or in service on the ground.

The failsafe cycling component, in still other examples, prevents failsafe cycling of controllers without a hardware design change to the controllers (BPCU or GCU). This results in a substantial cost savings over a hardware re-design for the BPCU and GCU.

In addition, the failsafe cycling component does not impact the normal power-up time of the BPCU/GCU and prevents a BPCU or GCU from unpredictably powering up in-flight without a manual user action, such as by a pilot, flight crew or maintenance technician. The failsafe cycling component is also flexible to ensure a controller can be installed during maintenance without adding any new power-up procedures. This ensures a known and predictable response to a controller with any issue that results in a failsafe condition during flight.

Referring more particularly to the drawings, FIG. 1 is a block diagram illustrating an aircraft 100 including power system controller cycling protection. The aircraft 100 can be implemented as any type of aircraft. For example, but without limitation, the aircraft 100 can include a fixed wing, rotary wing, or lighter-than-air aircraft. The aircraft 100 can be configured for carrying passengers, cargo, both passengers and cargo, or can be used for performing any other operation or mission. The aircraft 100 can be operated by an airline, a military unit, or any other private or governmental entity.

The aircraft 100, in one example, includes a power system 102 having a set of one or more generators 104 and a set of one or more controllers 106. The set of controllers 106, in some examples, includes a set of bus power control units 108 and/or a set of GCUs 110. The failsafe cycling component, in other examples, includes software for controlling electrical components on the aircraft 100.

The set of generators 104 are driven by operation of the engines of aircraft 100. For example, but without limitation, the set of generators 104 can generate power which is carried by feeder lines to aircraft electrical power controllers for distribution and conversion. The aircraft electrical power system controllers convert the power provided by the set of generators to electrical power for equipment loads and other functions on the aircraft 100.

The BPCU and GCU are electrical power system controllers on the aircraft 100 responsible for keeping electrical buses powered with various source configurations and in a manner that conforms to power quality requirements, such as, with respect to voltage transients, interrupts, and dead bus times. When a BPCU or GCU has an internal failure, the BPCU or GCU may not be able to continue to perform in an acceptable manner. Each controller is designed to recognize internal errors and shutdown in a predictable manner into the failsafe state.

The set of BPCUs 108 in some examples includes one or more BPCUs, such as, but not limited to, the BPCU 112. Each BPCU in the set of BPCUs 108 includes a failsafe cycling component 114 to prevent failsafe cycling. The set of GCUs 110 includes one or more GCUs, such as, but not limited to, GCU 116. Each GCU in the set of GCUs 110 includes a failsafe cycling component 118 for preventing the GCU from cycling in and out of failsafe state.

The failsafe cycling component 114 or 118, in some examples, includes software logic integrated into the power-up sequence of the BPCU 112 and GCU 116 to determine if it is acceptable to start operating and managing power. The failsafe cycling component 114 or 118, in other examples, utilizes a software latch/flag that checks for conditions indicating servicing, aircraft in-flight and/or manual activation of control switches on the flight deck. The failsafe cycling component 114 or 118 prevents some controllers from restarting after entering failsafe state under certain conditions to prevent random failsafe cycling during aircraft flight (air mode).

The failsafe cycling component 114 or 118, in some examples, creates a parameter written to the controller internal memory that decides to enable the protection function, as well as the logic which allows for the controller to recover from a failsafe state based on manual action or appropriate ground conditions.

The set of controllers 106 provides power of multiple voltage types to a set of electrical power buses 120. The set of electrical buses 120 provide power to a set of one more loads 122 associated with the aircraft 100. The loads 122 can include any electrical device or system on the aircraft 100 that uses electrical power.

In some examples, the failsafe cycling component 114 or 118 prevents a controller from switching out of the failsafe state and back into normal operating state during flight. The operating state is the state in which the controller is operating within normal parameters or otherwise performing the controller functions as expected. The operating state includes a condition in which internal power of the controller is within an acceptable threshold range, without overvoltage or undervoltage. The operating state may also be referred to as the normal operating state, operating mode, operational state, operational mode, active mode, awake mode, or functional mode.

In other examples, the failsafe cycling component 114 or 118 permits the controller to exit the failsafe state and return to a normal operating state if a manual action is detected, such as, but not limited to, activation of at least one control switch in a set of control switches 124 by a member of the flight crew 126. The set of control switches 124 includes one or more physical switches on the flight deck 128, such as, but not limited to, a generator control switch 130 and/or an external power switch 132. In some non-limiting examples, the flight deck switch(es) are switches that have a direct input to the associated power system controller.

The flight deck 128 also can be referred to as the cockpit of aircraft 100. The flight deck can optionally include various controls which enable flight crew 126 to control the operation of aircraft 100. The flight crew 126 can include a pilot, a co-pilot, a navigator, other personnel, or various combinations of personnel for controlling the operation of aircraft 100.

In still other examples, the failsafe cycling component 114 or 118 permits a given controller to exit out of failsafe state if a set of generator control breakers 134 associated with the set of generators 104 is detected in an open configuration 136. During flight (air mode), the set of generator control breakers 134 remain in a closed configuration 138.

In this manner, the failsafe cycling component 114 or 118 prevents intermittent failure in the LVPS from causing a controller to enter failsafe state and then power up (return to normal operating state) many times in random sequence during flight. The intermittent failure can occur when the controller internal power supply intermittently fails when the voltage falls outside an acceptable voltage threshold range triggering failsafe (sleep) mode and then returns to normal operational mode when the voltage returns to a value within the threshold range. The controller mis-interprets this sequence of events as going through a power cycle (on and off power cycle) if the low voltage power supply drops out, such as an undervoltage below a threshold value and/or an overvoltage above a threshold value and then returns to a value within the acceptable threshold range. That is, the un-deterministic behavior can be caused by how a power cycle is determined to have occurred. The failsafe cycling protection ensures deterministic behavior, while avoiding random false power cycles.

Figure 2:
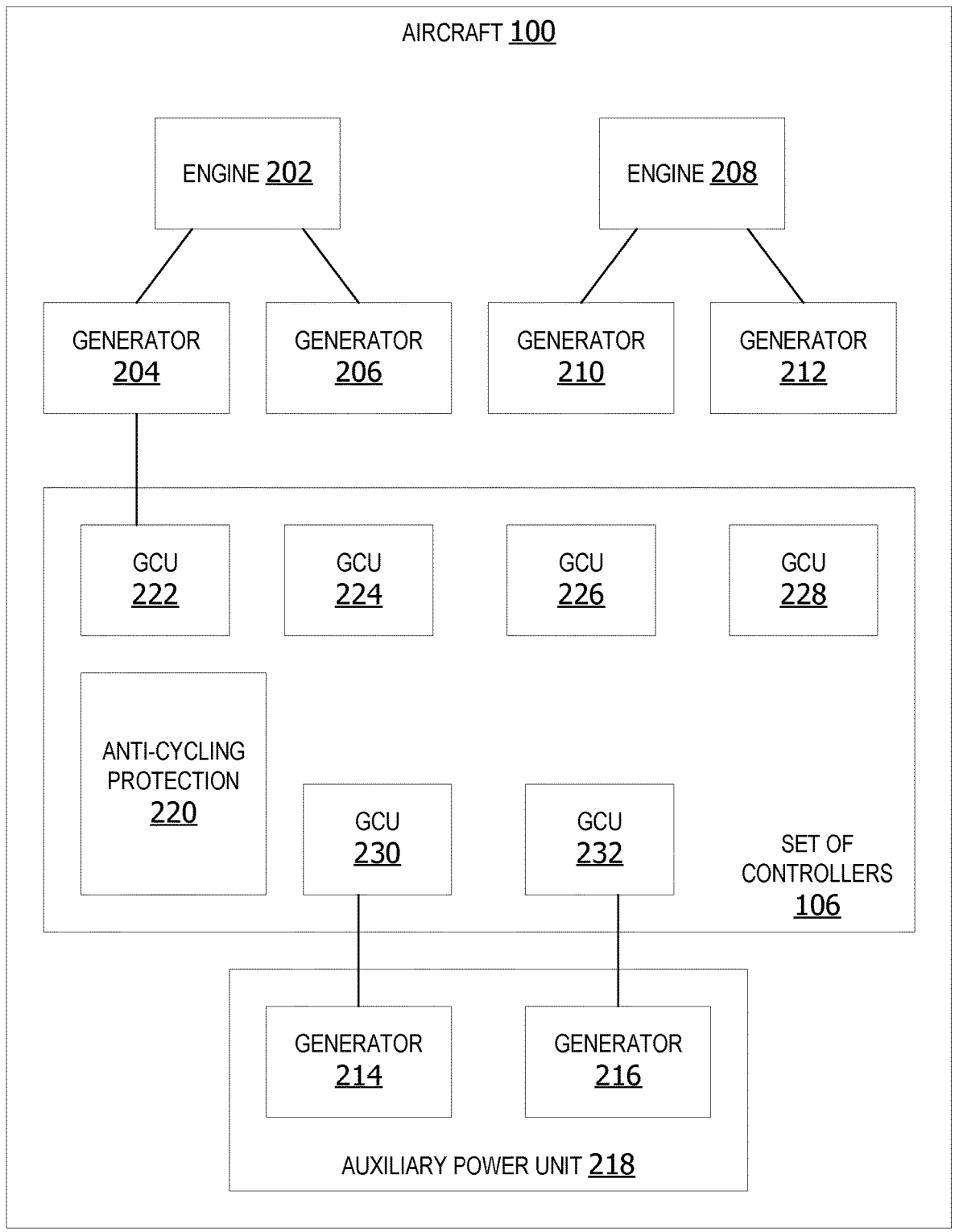
FIG. 2 is a block diagram illustrating a set of controllers associated with a set of generator control units having anti-cycling protection according to an implementation.

FIG. 2 is a block diagram illustrating a set of controllers 106 associated with a set of generator control units having anti-cycling protection. In some examples, the aircraft 100 includes a set of two engines. Each engine is associated with a pair of generators. The engine 202 is associated with a generator 204 and a generator 206. The engine 208 is associated with a generator 210 and a generator 212.

An auxiliary power unit 218, in other examples, includes a set of one or more generators. In this example, the auxiliary power unit 218 includes a first generator 214 and a second generator 216.

Each generator on the aircraft 100 is associated with a generator control unit in the set of controllers 106. Each controller in the set of controllers 106 includes anti-cycling protection 220. In one example, the set of controllers includes six GCUs. The GCUs 222 and 224 are associated with the generators for the engine 202. The GCUs 226 and 228 are associated with the pair of generators for the engine 208. The auxiliary GCUs 230 and 232 are associated with the auxiliary generators 214 and 216. The GCUs 222, 224, 226, 228, 230 and/or 232 may be a controller, such as, but not limited to, the GCU 116 in FIG. 1.

The set of controllers 106, in some examples, can also include one or more BPCUs, such as, but not limited to, the BPCU 118 in FIG. 1. In other examples, the aircraft 100 includes two BPCUs (not shown).

The aircraft 100, in this non-limiting example, includes four engine fed generators on a twin-engine configuration that are primarily operating in-flight with two generators per engine. The aircraft 100 also has two large generators on the auxiliary power unit. The auxiliary engines do not normally operate during flight. Each generator has a dedicated GCU (e.g., the GCU 116) responsible for regulating the power of a corresponding generator and coordinating with other GCUs 116 to apply power to various electrical buses on the aircraft 100. In this example, as described herein, the aircraft 100 includes a set of six GCUs 116 performing functions including power transfer, control of power and regulation of power.

In one example, the aircraft 100 also includes two bus power control units that act as redundant controllers located in the forward of the aircraft 100. These controllers are primarily responsible for communicating with the aircraft data system to feed information to all other controllers and act in concert/junction with the GCUs to regulate power flow to buses on the aircraft 100 as well. The controllers allow power on and off to the forward buses on the forward part of the aircraft 100, which are lower voltage, such as 115 and 28 volts.

The GCUs 116 receive power separately from corresponding generators. The CGUs 116 are basically digital circuit controllers with microprocessors and low-level circuitry. The GCUs require an internal power supply to perform one or more functions. The GCUs have a common part therein, namely a low voltage power supply that receives 28 volts direct current (Vdc) and creates lower level voltages to supply various circuitry and electronics cards in order to perform its required functions within the power system controller.

If the low voltage power supply has a problem, the problem is recognized and the failsafe state is entered, with power shut off. For example, if there is a short circuit inside the low voltage power supply and the controller can no longer support the voltages needed on an output, the controller goes into failsafe state and thereby shuts itself down. The failsafe cycling component on each GCU 116 and BPCU 112 enables the system to react in a controlled and deterministic manner without interrupting the flow of power to the various buses on the aircraft 100.

Figure 3:
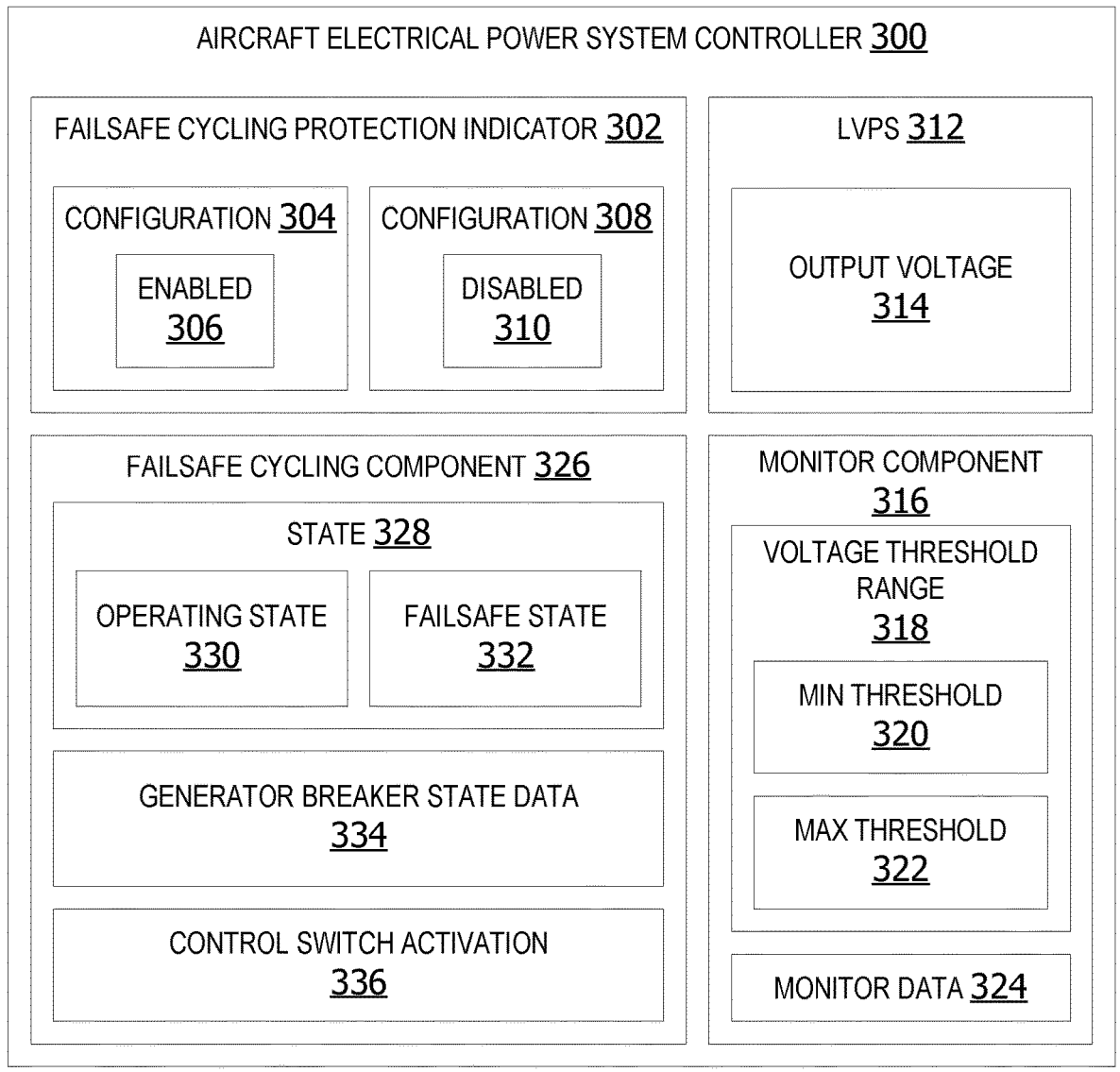
FIG. 3 is a block diagram illustrating an aircraft electrical power system controller according to an implementation.

FIG. 3 is a block diagram illustrating an aircraft electrical power system controller 300. The aircraft electrical power system controller 300 is a controller associated with a generator, such as, but not limited to, the set of controllers 106 in FIG. 1 and FIG. 2. The aircraft electrical power system controller 300 can include a BPCU, such as, but not limited to, the BPCU 112 in FIG. 1. The aircraft electrical power system controller 300 can also include a GCU associated with a generator, such as, but not limited to, the GCU 116 in FIG. 1.

A failsafe cycling protection indicator 302 is configured to indicate whether failsafe cycling protection is enabled within a given controller. In some examples, the failsafe cycling protection indicator 302 is implemented as a parameter or flag within non-volatile memory. In other examples, the failsafe cycling protection indicator 302 is implemented as a physical latch on or within the controller. In still other examples, the failsafe cycling protection indicator 302 includes a counter having a value which indicates whether anticycling protection is enabled.

In one example, the failsafe cycling protection indicator 302 includes a first configuration 304 indicating the failsafe cycling protection is enabled 306. A second configuration 308 indicates the failsafe cycling protection is disabled 310. Failsafe cycling protection is enabled during flight and disabled during maintenance when the aircraft is on the ground. Thus, normal maintenance practices with the BPCU 112 and GCU 116 on the ground are not changed. The failsafe cycling prevents undesirable cycling behavior in-flight. Removing this undesirable behavior enables an aircraft electrical power system to switch into and out of failsafe state with improved operating characteristics.

A low voltage power supply (LVPS) 312 on the aircraft electrical power system controller 300 generates an output voltage 314 that is used internally within the controller 300 to supply circuitry and electronics cards. A monitor component 316 monitors the output voltage 314 to ensure the voltage output by the LVPS 312 is within an acceptable voltage threshold range 318 (e.g., a defined operating range).

The acceptable voltage threshold range 318 optionally includes a minimum threshold 320 and a maximum threshold 322. If the output voltage exceeds the maximum threshold 322 an overvoltage is indicated. If the output voltage 314 falls below the minimum threshold 320, the LVPS output voltage 314 is indicated as an undervoltage.

If the output voltage 314 is an overvoltage or an undervoltage, the aircraft electrical power system controller 300 exits a normal operating state 330 and enters a failsafe state 332. During the failsafe state 332, the aircraft electrical power system controller 300 ceases regulating and controlling power to one or more buses.

One type of internal failure that can result in shutdown to a failsafe state 332 is due to issues/faults associated with the internal low voltage power supply. Each BPCU 112 and GCU 116 operates internal circuitry from one or more low voltages, such as 5V, 3.3V, +15V and −15V outputs supplied by the LVPS.

A failsafe cycling component 326 determines whether the aircraft 100 is in air mode or is on the ground based on analysis of monitor data 324. The monitor data 324 is data associated with the operating frequency of generators and/or generator breaker state data 334 indicating whether generator circuit breakers are open or closed. The generator circuit breakers include any device that disconnects a bus from a generator when the generator circuit breaker is in the open configuration.

If the monitor data 324 indicates air mode and failsafe cycling protection is enabled 306, the failsafe cycling component 326 does not permit the aircraft electrical power system controller 300 to leave the failsafe state without manual action.

The manual action, in some examples, includes control switch activation 336. Control switch activation 336 refers to manual activation of one or more physical control switches associated with the flight deck of the aircraft 100, such as, but not limited to, the set of set of control switches 124 in FIG. 1. In lieu of manual action, generator circuit breaker status may also be sensed to determine operating state 330 is allowed. This alternative to manual action enables the controller to leave failsafe state by sensing that both engines are off (an on-ground state) via sensing the state of generator circuit breakers as open. This may occur, for example, during maintenance on the aircraft. The on-ground state refers to the aircraft on the ground as opposed to being in-flight.

Figure 4:
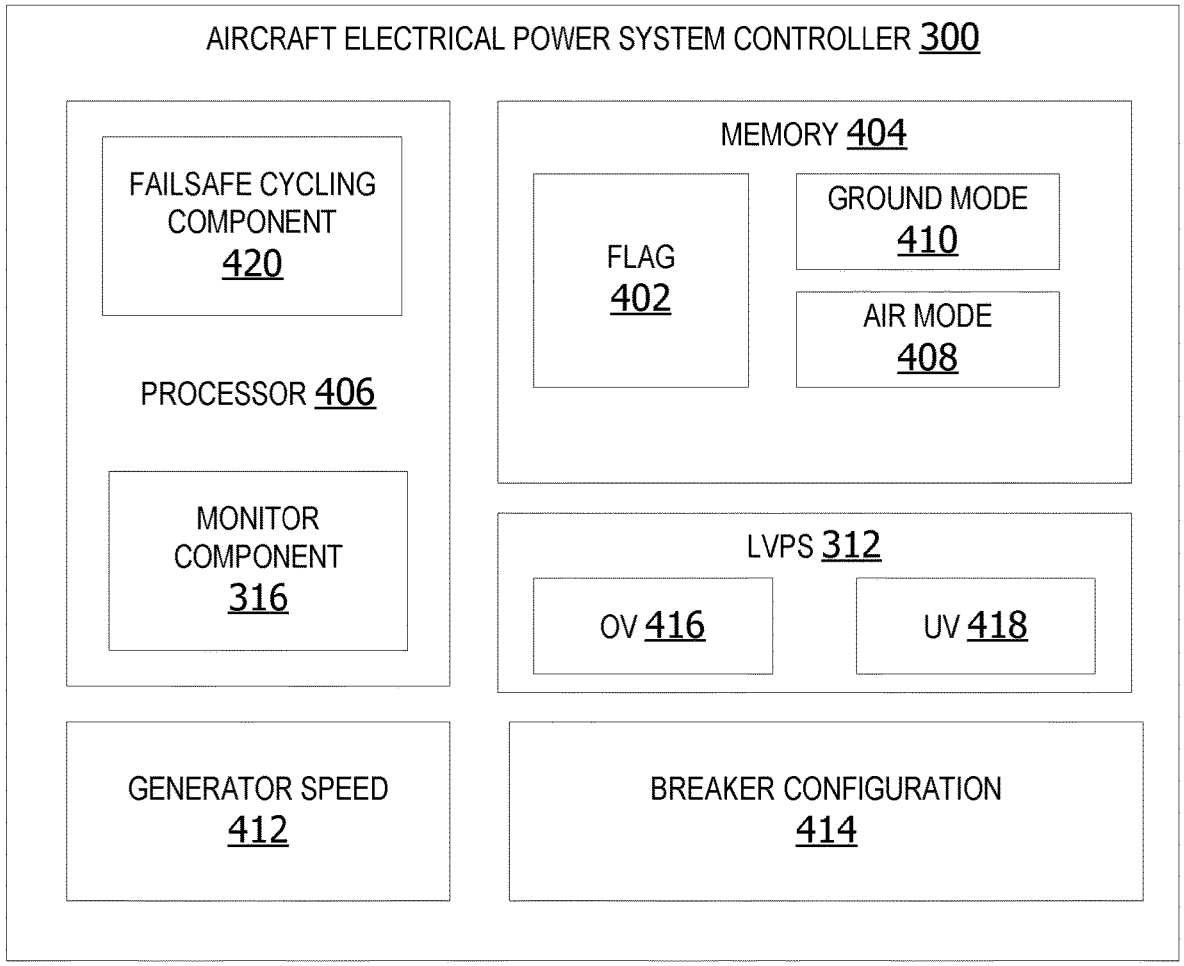
FIG. 4 is a block diagram illustrating a flag indicating enablement of failsafe cycling protection in an aircraft electrical power system controller according to an implementation.

FIG. 4 is a block diagram illustrating a flag 402 indicating enablement of failsafe cycling protection in the aircraft electrical power system controller 300. The flag 402 is a parameter or indicator in memory 404 indicating whether the failsafe cycling protection is enabled or disabled. In some examples, if failsafe cycling protection is enabled, the flag 402 is set to true.

The monitor component 316, in some examples, monitors an output voltage generated by the LVPS 312. If the monitor component 316 detects an over voltage 416 or an undervoltage 418, while the aircraft is in air mode 408 and the failsafe cycling protection is enabled, the aircraft electrical power system controller 300 remains in failsafe state until a manual action is detected and/or the aircraft returns to ground mode 410.

In some examples, the aircraft electrical power system controller 300 includes one or more processors, such as, but not limited to, the processor 406. The processor 406 includes any quantity of processing units and is programmed to execute the computer-executable instructions.

The failsafe cycling component 420, in some examples, is a software component executed by the processor 406 to inhibit the aircraft electrical power system controller 300 from cycling in and out of failsafe state during air mode. The failsafe cycling component 420 analyzes monitor data in other examples to determine whether to prevent the aircraft electrical power system controller 300 from exiting failsafe state without manual action.

The memory 404, in some examples, is implemented as a computer readable media or other data storage device. By way of example and not limitation, computer readable media comprise computer storage media and communication media. Computer storage media include volatile and non-volatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

In one implementation, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 5:
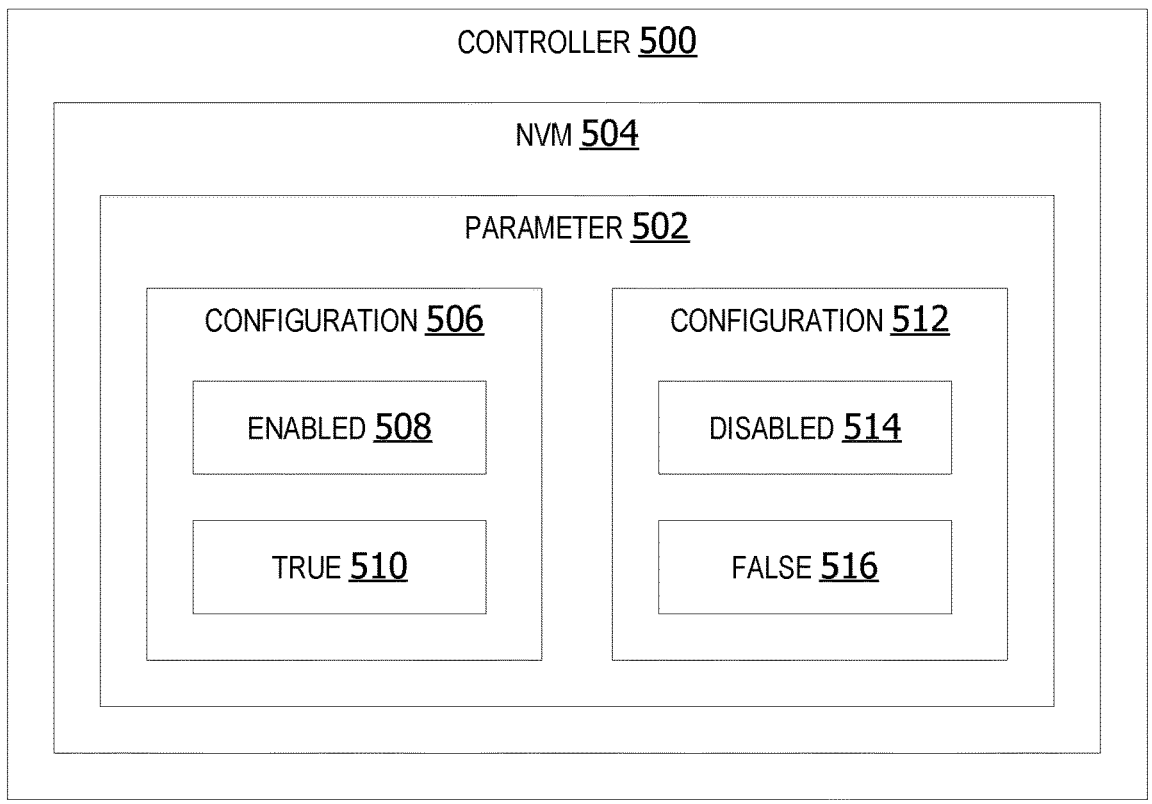
FIG. 5 is a block diagram illustrating a failsafe cycling protection indicator including a parameter in non-volatile memory according to an implementation.

FIG. 5 is a block diagram illustrating a failsafe cycling protection indicator including a parameter in non-volatile memory. The controller 500, in this example, is an aircraft electrical power system controller, such as, but not limited to, a controller in the set of controllers 106 in FIG. 1 and/or the aircraft electrical power system controller 300 in FIG. 3.

In this example, a parameter 502 in non-volatile memory (NVM) 504 indicates whether failsafe cycling protection is enabled. The parameter 502 is a failsafe cycling protection indicator, such as, but not limited to, the failsafe cycling protection indicator 302 in FIG. 3 and/or the flag 402 in FIG. 4.

In a first configuration 506, the parameter 502 indicates failsafe cycling protection is enabled 508 if the parameter has a value of true 510. A second configuration 512 of the parameter 502 indicates failsafe cycling protection is disabled 514 if the value is set to false 516.

In some non-limiting examples, the parameter 502 is an internal variable in NV-RAM that latches to indicate if failsafe cycling protection variable should be enabled. The failsafe cycling protection is active when the aircraft 100 is in the air (not on the ground) and the engines are running.

Figure 6:
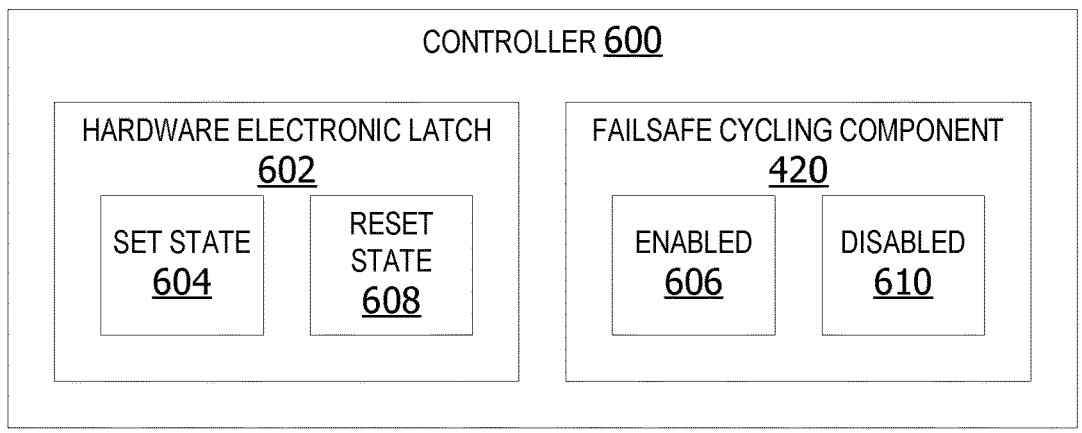
FIG. 6 is a block diagram illustrating a failsafe cycling protection indicator including a hardware electronic latch according to an implementation.

FIG. 6 is a block diagram illustrating a failsafe cycling protection indicator including a hardware electronic latch 602. The controller 600, in this example, is an aircraft electrical power system controller, such as, but not limited to, a controller in the set of controllers 106 in FIG. 1 and/or the aircraft electrical power system controller 300 in FIG. 3.

The hardware electronic latch 602 is an electronic latching that when triggered, will set and maintain an output signal until it is reset. When the hardware electronic latch 602 on the controller 600 is in a set state 604, the failsafe cycling component 420 providing failsafe cycling protection is enabled 606. In the reset state 608, the failsafe cycling protection is disabled 610. In some examples, the latch 602 latches a controller in failsafe until a manual action is taken on the ground by maintenance personnel.

Figure 7:
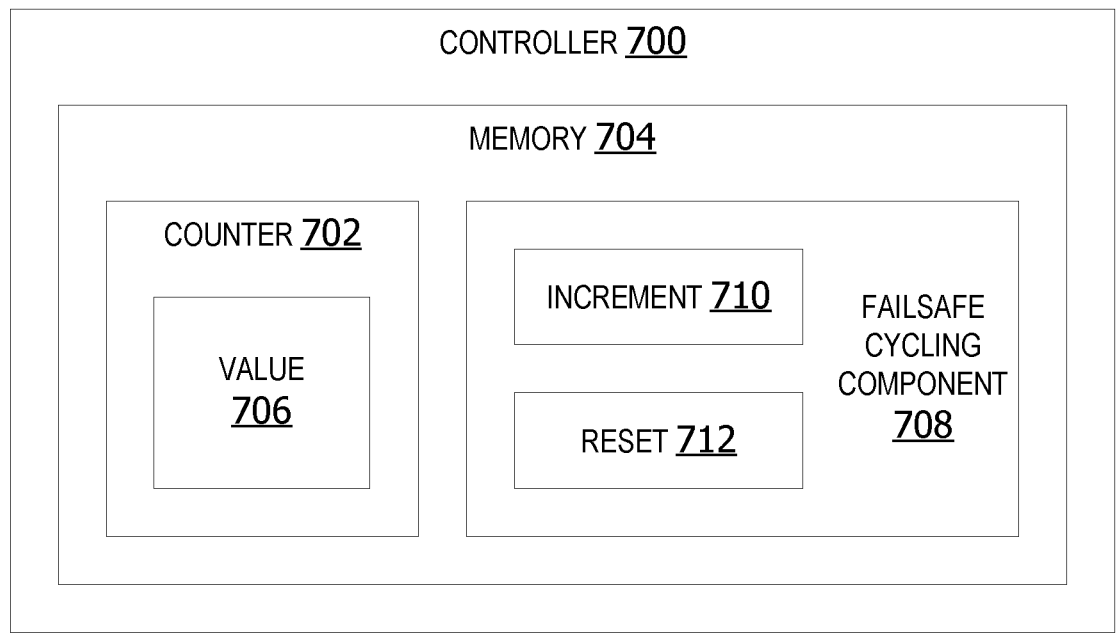
FIG. 7 is a block diagram illustrating a failsafe cycling protection indicator including a counter according to an implementation.

FIG. 7 is a block diagram illustrating a failsafe cycling protection indicator including a counter. The controller 700 in this example is an aircraft electrical power system controller, such as, but not limited to, a controller in the set of controllers 106 in FIG. 1 and/or the aircraft electrical power system controller 300 in FIG. 3.

The counter 702 in memory 704 on the controller 700 has a value 706. The value can be incremented 710 by the failsafe cycling component 708 or reset 712. The value 706, in some examples, indicates whether failsafe cycling protection is enabled or disabled.

In some non-limiting examples, the counter is incremented by the failsafe cycling component based on transition to engine start (for the GCU 116) or actions of a ground handling relay (for the BPCU 112). The counter value 706 is reset to an original value or zero counter value based on the transition to engine shutdown (for the GCU 116) or transition to air mode (for the BPCU 112). The counter incrementing above a certain value is assessed when the controller powers up to determine if the controller is allowed to exit from the failsafe state.

Figure 8:
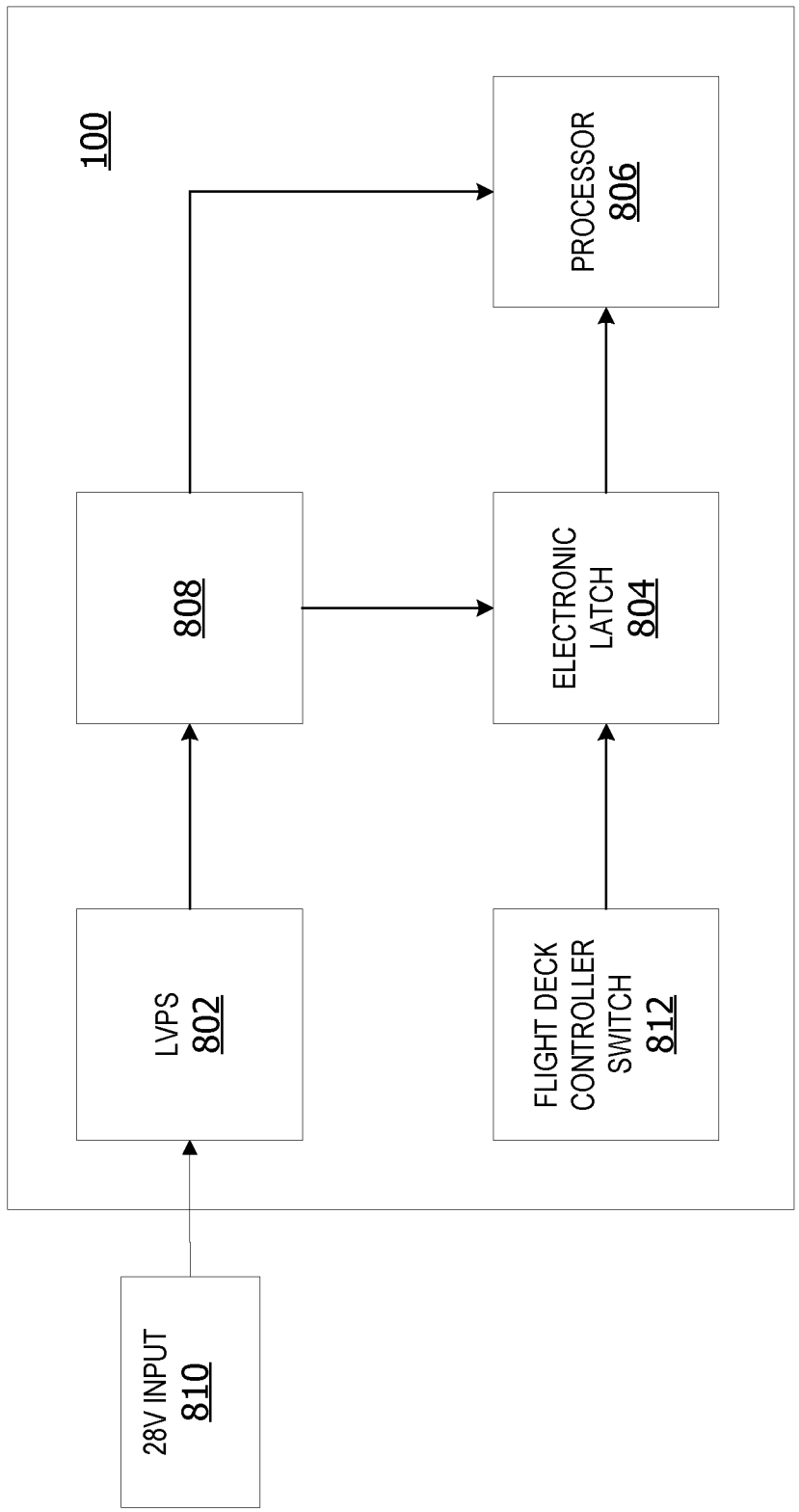
FIG. 8 is a block diagram illustrating a hardware interlock for failsafe cycling protection according to an implementation.

FIG. 8 is a block diagram illustrating a hardware interlock for failsafe cycling protection. In this example, the LVPS 802 generates a voltage output that is monitored by a monitor component 808 associated with aircraft 100. The monitor component 808 activates a low going signal that causes the processor 806 to be in reset and triggers the electronic latch 804 to a "set" state. The electronic latch 804 maintains the latched state as long as the 28V input 810 sources are continuous. The output of the electronic latch 804 is a signal input to the processor 806, such that if the LVPS 802 spontaneously is restored, and the processor 806 executes power up routines, there is programmed logic that prevents the processor 806 from completing power up and go immediately into the failsafe state. Once in the 'set' state, the electronic latch 804 can be 'reset' by removing and re-applying the 28V input 810 source power, or by momentarily activating the flight deck controller switch 812. In this manner, the failsafe state is not reset until the system determines that all 28Vdc power inputs ceased and were restored.

Figure 9:
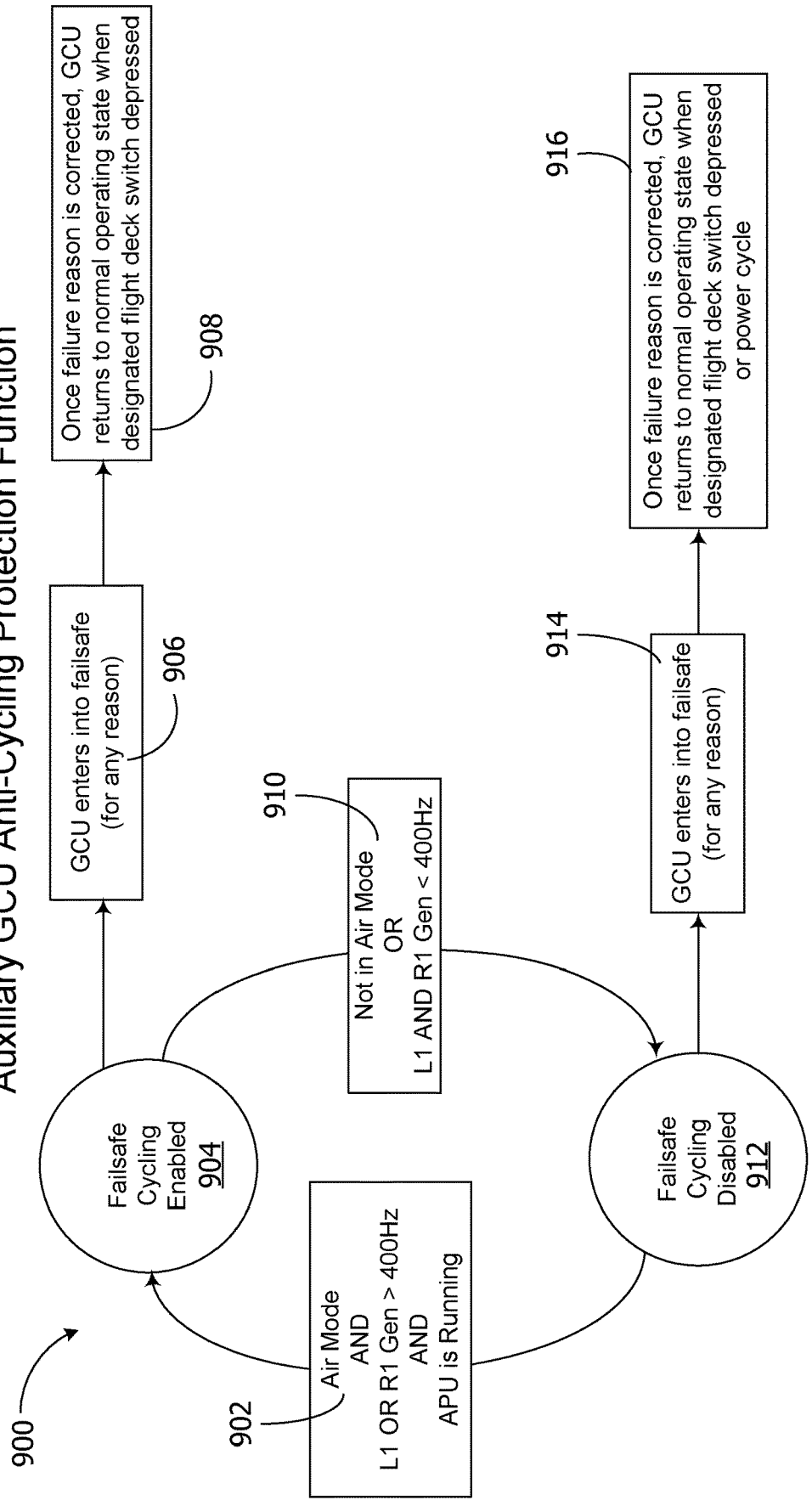
FIG. 9 is a block diagram illustrating an auxiliary GCU anti-cycling protection function according to an implementation.

FIG. 9 is a block diagram illustrating an auxiliary GCU anti-cycling protection function at 900. In some examples, if the controller detects air mode and at least one generator (left engine or right engine generator) outputting at more than 400 Hz while the APU is running at 902, the controller enables failsafe cycling protection at 904. If the controller enters failsafe state for any reason at 906, the GCU does not return to the normal operating state until the generator control switch (GCS) transitions from on to off or from off to on via a manual activation of the physical switch in the flight deck. Once failure reason is corrected, the GCU returns to the normal operating state when the designated flight deck switch depressed at 908.

In other examples, if the output of a generator monitored on each engine or the output of both generators is less than 400 Hz, indicating the generators are turned off or when the aircraft is out of flight mode 910, the failsafe cycling protection is disabled at 912. If the controller enters failsafe state for any reason 914 once failure reason is corrected, the GCU returns to normal operational state with designated flight deck switch depressed or power cycle 916.

In some examples, the auxiliary GCU failsafe cycling protection method is enabled with a parameter written to internal NVM if the auxiliary GCU detects the air mode, at least one generator speed is greater than 400 Hz, and an auxiliary power unit (APU) ready-to-load parameter is true (i.e., APU is running).

The auxiliary GCU has some scenarios where automatic recovery in air mode is allowed. These scenarios are allowed if the APU is not running in-air. Additionally, the auxiliary GCU does not impact normal bus power sources when the APU is not already running. Therefore, this condition does not require limitations unless the APU is operating.

Failsafe cycling protection, in other examples, is disabled if the aircraft 100 is not in air mode or the system determines that both engines are not running (monitor one generator speed per engine). If the auxiliary GCU 116 powers up when controller power levels (voltage) are detected within an acceptable threshold range with the failsafe cycling protection enabled (or true), the GCU 116 remains in the failsafe state and does not recover from the failsafe state by returning to the normal operational state until the associated flight deck switch, such as a generator control switch on the flight deck, is activated. The flight deck switch can be activated when the switch is selected from on to off or from off to on position by the user. In other examples, the switch is activated when the user presses or depresses the switch.

Figure 10:
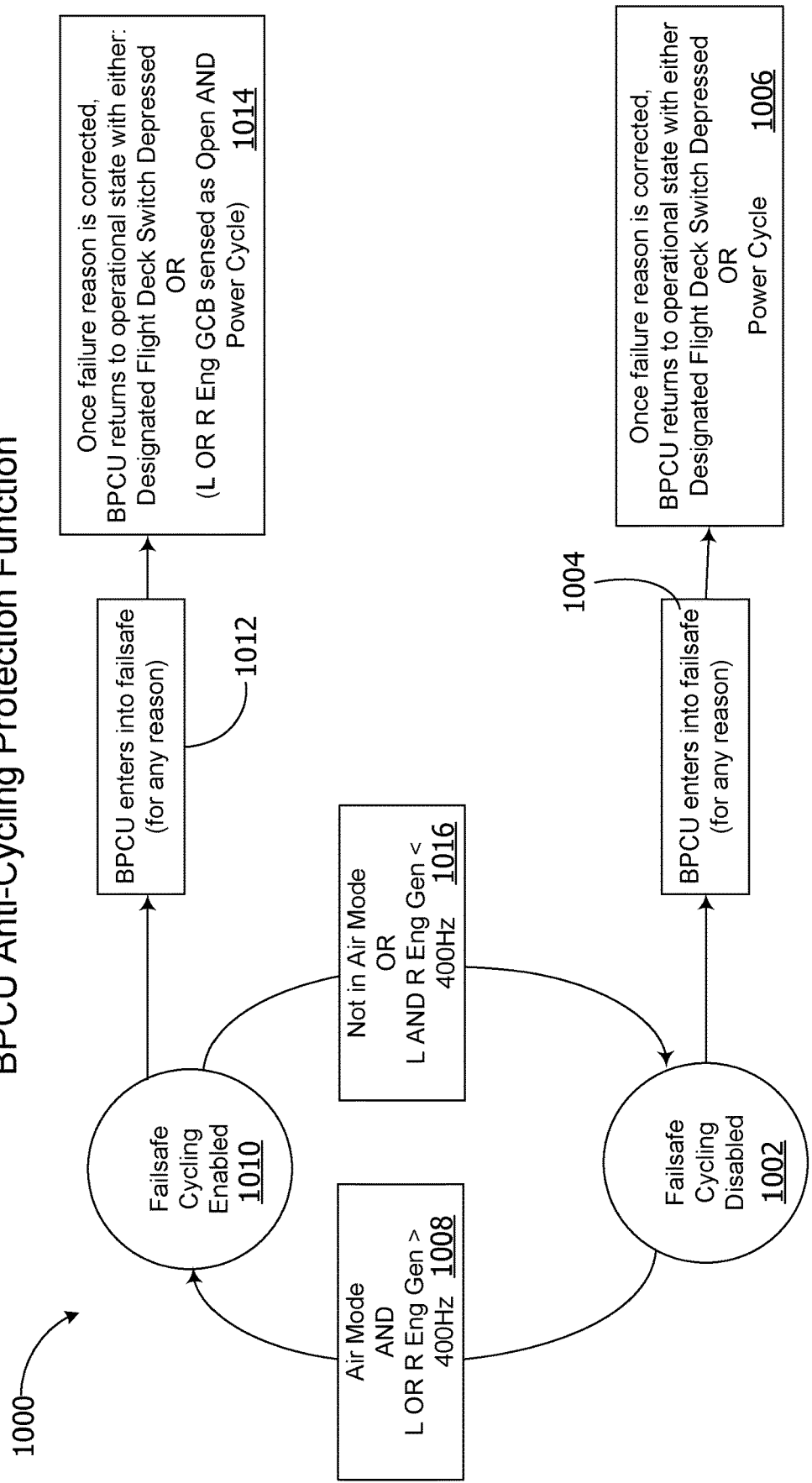
FIG. 10 is as block diagram illustrating a bus power control unit (BPCU) anticycling protection function according to an implementation.

FIG. 10 is a block diagram illustrating a BPCU anticycling protection function. When the failsafe cycling protection is disabled 1002 and the BPCU 112 enters the failsafe state for any reason 1004, the BPCU returns to normal operating state (leaves failsafe state) with manual activation of a control switch or power cycle returning the output voltage of the LVPS to a voltage within the acceptable threshold range once the failure reason is corrected at 1006.

If an air mode is detected and at least one generator (left engine generator or right engine generator) operates above defined levels. For example, at 400 hertz (Hz) or greater at 1008, the failsafe cycling protection is enabled at 1010. When enabled, if the BPCU 112 enters the failsafe state for any reason 1012, the BPCU 112 does not exit failsafe state until a physical switch is manually depressed or a power cycle occurs with at least one generator circuit breaker open in a configuration at 1014.

Thus, once the failure reason is corrected, the BPCU will return to operational state (come alive) with designated flight deck switch depressed or left engine or right engine GCB sensed as open with power cycle detection.

In some examples, if the aircraft 100 is not in the air mode or both generators (L1 and R1) operate at less than 400 Hz at 1016, the failsafe cycling protection is disabled at 1002.

It should be appreciated that other frequency values can be used. In these examples, if both generators are essentially off (i.e. generator frequency is low), it indicates the corresponding engines associated with those off-line generators are also off, based on data available within the controller (when it is not in failsafe and communicating with other system controllers).

Thus, in some examples, BPCU failsafe cycling protection is enabled with a parameter written to internal NVM when the BPCU 112 detects air mode and at least one generator speed is greater than 400 Hz. The BPCU 112 does not utilize air mode alone to determine whether to exit the failsafe state due to certain maintenance functions and installation of new controllers to the aircraft 100, which may have an air mode status recorded in memory while the aircraft 100 is on the ground.

In other examples, failsafe cycling protection is disabled if the aircraft 100 is not in air mode or all generator speeds are less than 400 Hz indicating the aircraft engines are off. If the BPCU 112 powers up with the failsafe cycling protection enabled (flag is true), the BPCU 112 does not recover from the failsafe state until its associated external power switch (physical button) is depressed on the flight deck or the controller power-up with either a left engine or right engine GCB senses as open (which does not occur in-flight).

In other examples, when the BPCU 112 detects the air mode and at least one generator (left engine generator or right engine generator) operates above defined levels (i.e. above 400 Hz), the system writes a flag (parameter) into internal NVM that indicates that if the controller goes into failsafe state and then powers up, the controller is not allowed to come online unless the aircraft is not in-flight. The controller can determine the aircraft is not in-flight if one generator circuit breaker is open or at least one generator is offline, which would not be the expected state of generator circuit breakers during flight.

Thus, in some examples, both the left and right engines are shut down or ground mode is detected before the BPCU 112 is allowed to return to the normal operating state when the controller powers up (power within the acceptable threshold range) after a power cycle. Thus, if the aircraft is detected in either ground mode or both engines are detected in shutdown, the BPCU is permitted to return to normal operational state out of failsafe state when the voltage again falls within the acceptable threshold value after power cycle. This ensures the aircraft 100 is on the ground prior to the BPCU failsafe cycle occurring.

Figure 11:
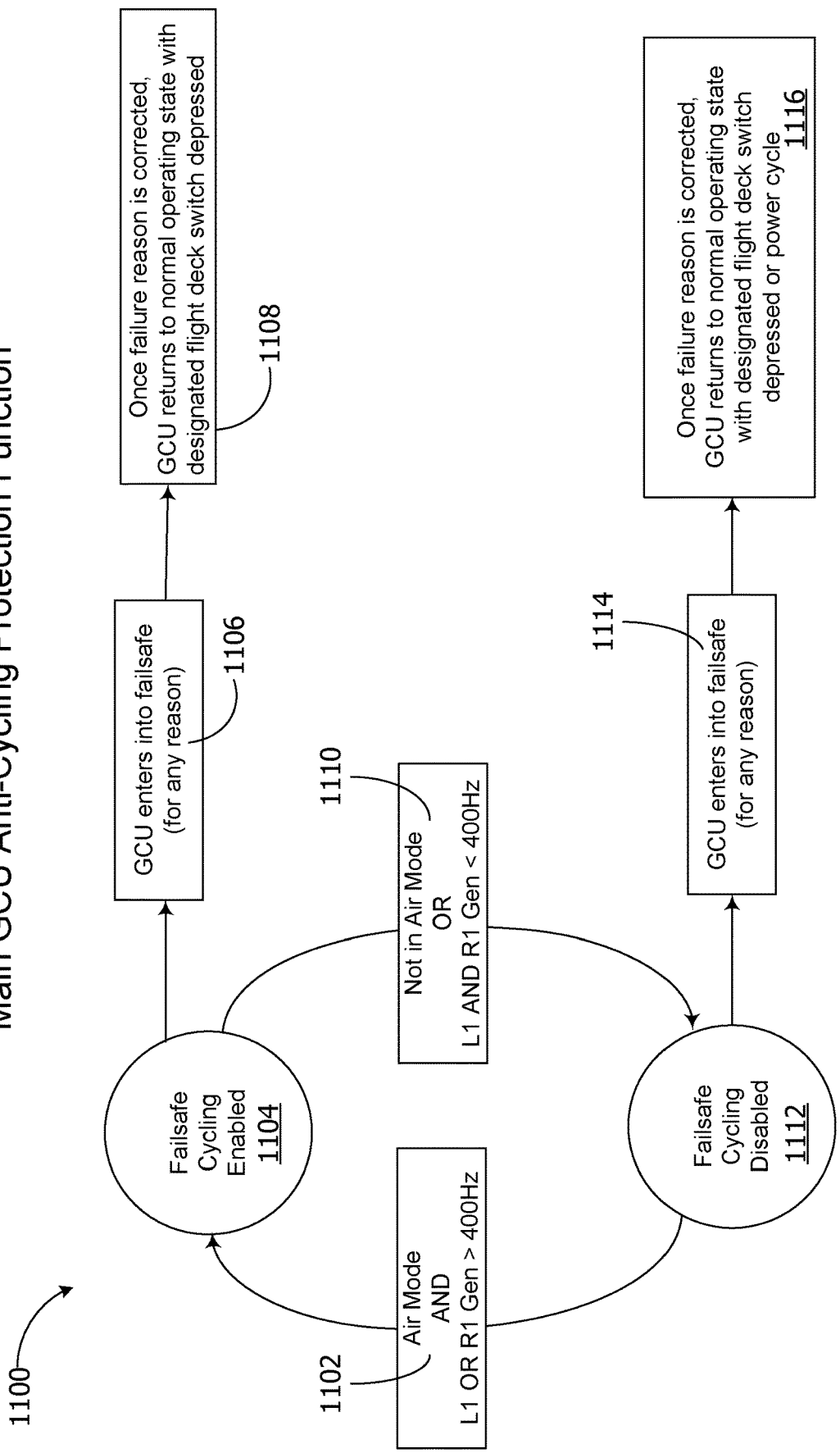
FIG. 11 is a block diagram illustrating a generator control unit (GCU) anticycling protection function according to an implementation.

FIG. 11 is a block diagram illustrating a GCU anticycling protection function 1000. In some examples, if the controller detects the air mode and at least one generator (left engine or right engine generator) is outputting at more than 400 Hz at 1102, the controller enables failsafe cycling protection at 1104. If the controller enters failsafe state for any reason at 1106, the GCU does not switch to operating state until an associated/appropriate flight deck switch is actuated per pilot procedure at 1108.

In other examples, if the aircraft 100 is not in air mode or the output of both generators is less than 400 Hz, indicating the generators are turned off, at 1110, the failsafe cycling protection is disabled at 1112. If the controller enters failsafe state for any reason at 1114 while the failsafe cycling protection is disabled, the controller (GCU 116) returns to normal operating state after a power cycle or activation (depression) of a designated flight deck switch at 1116.

The main GCU failsafe cycling protection method is enabled in some examples when a flag (parameter) written to internal NVM is set to true, and the main GCU detects the air mode and a generator speed of at least one generator is greater than 400 Hz.

Thus, the main GCU does not utilize air mode alone to determine whether to exit failsafe state due to certain maintenance functions and installation of new controllers to the airplane, which can have an air mode status recorded in memory while the aircraft 100 is on the ground.

In other examples, failsafe cycling protection within the main GCU is disabled when the aircraft 100 is not in air mode or a determination is made that both engines are shut down. In other words, this is used to determine that both engines are not running. This determination can be made based on operational state of the corresponding generators associated with the engines. If the main GCU powers up with the failsafe cycling protection enabled (or true), the GCU does not recover (exit) from the failsafe state until the associated generator control switch on the flight deck is activated. Activation of the switch can occur when the switch state is toggled from on to off or from off to on or when the switch is depressed via button push or other switch activation mechanism.

Figure 12:
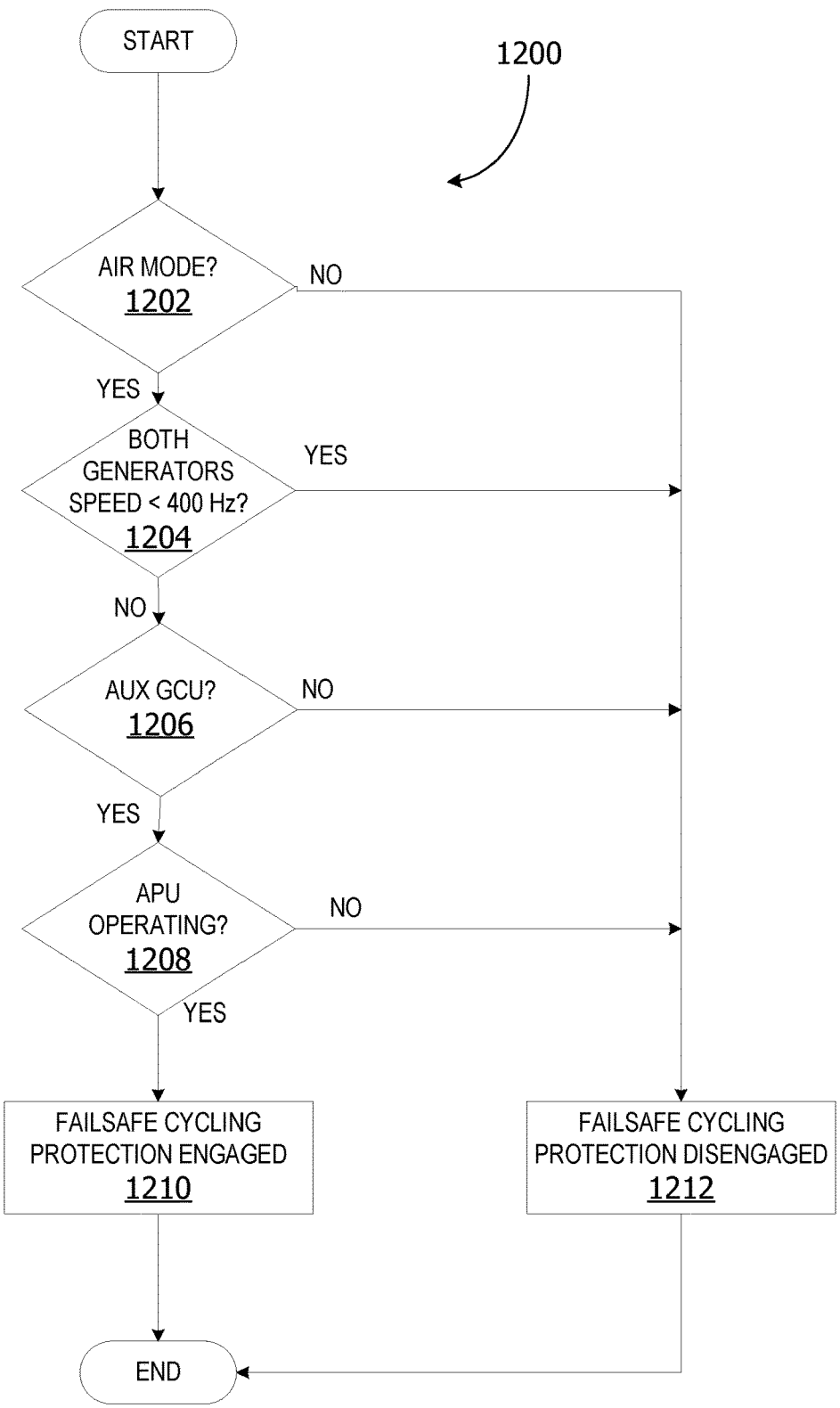
FIG. 12 is a flow chart illustrating an implementation of a failsafe cycling component for engaging failsafe cycling protection.

FIG. 12 is a flow chart 1200 illustrating an implementation of a failsafe cycling component for engaging failsafe cycling protection. In one implementation, the operations illustrated in FIG. 12 are performed, at least in part, by executing instructions by the one or more processors, such as, but not limited to, the processor 406 in FIG. 4.

At operation 1202, the controller determines if the aircraft is in air mode. If yes, a determination is made whether both generators have a speed less than 400 Hz at operation 1204. If yes, failsafe cycling protection is disengaged at operation 1212.

A determination is made whether the controller is an auxiliary GCU at 1206. If yes, a determination is made whether an auxiliary power unit (APU) is operating at operation 1208. If the controller is a BPCU/GCU, the system does not determine if the APU is operating. Returning to 1208, if the APU is operating, failsafe cycling protection is engaged at operation 1210. The process terminates thereafter.

Figure 13:
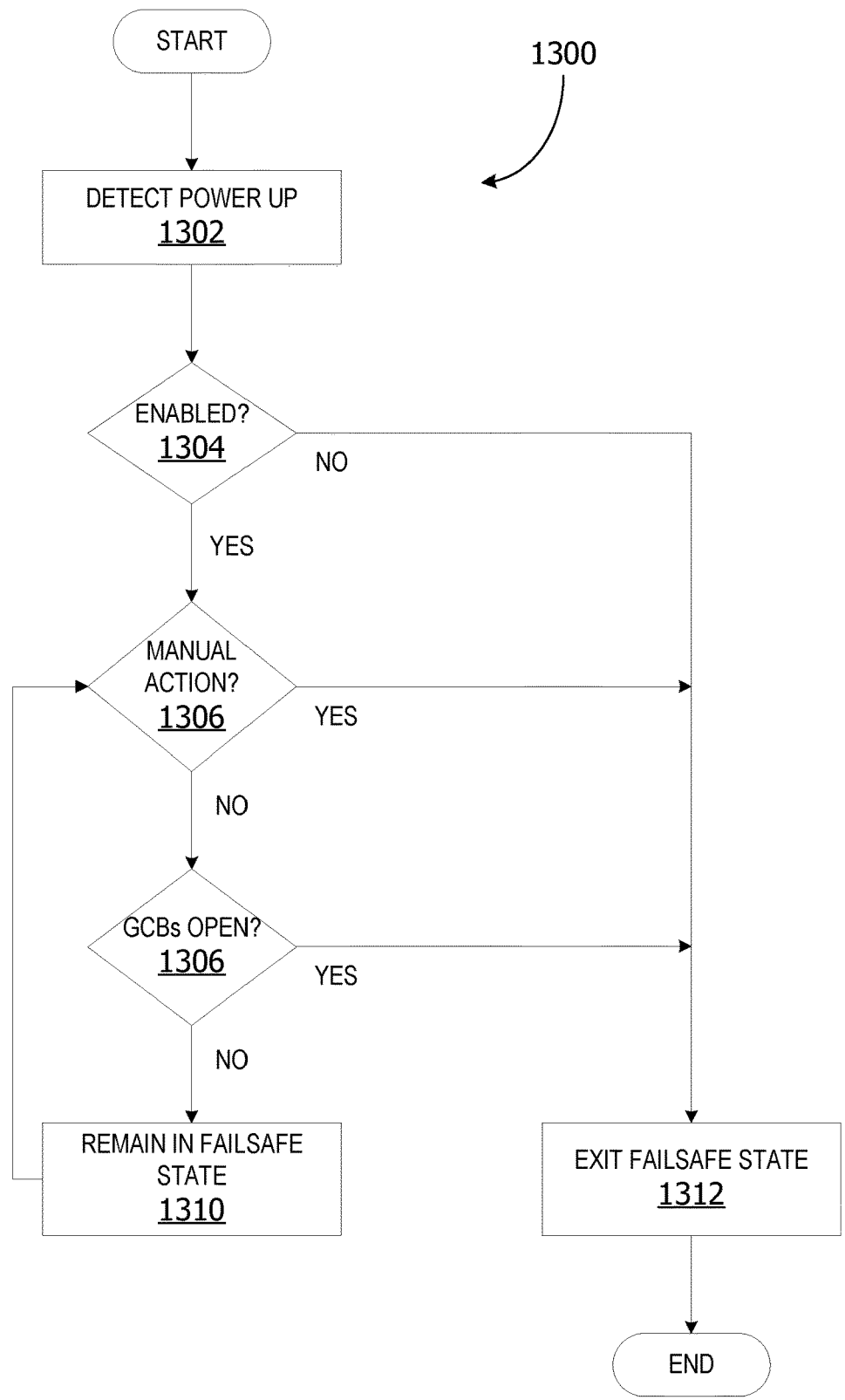
FIG. 13 is a flow chart illustrating an implementation of a failsafe cycling component inhibiting failsafe cycling in air mode.

FIG. 13 is a flow chart 1300 illustrating an implementation of a failsafe cycling component inhibiting failsafe cycling in air mode. In one implementation, the operations illustrated in FIG. 13 are performed, at least in part, by executing instructions by the one or more processors, such as, but not limited to, the processor 406 in FIG. 4.

It should be noted that the present disclosure can be implemented in connection with any controller for a power system, such as any controller for an aircraft power system bus. In some examples, the herein described systems and methods are operable with a generator, a source controller, and/or a bus controller, among others.

At operation 1302, the controller powers up after entering a failsafe state. A determination is made whether failsafe cycling protection is enabled at operation 1304. If yes, a determination is made whether manual action is detected at operation 1306. If no, a determination is made whether either GCBs are open at operation 1308. If no, the controller remains in failsafe state at operation 1310. The process remains in failsafe state and continues monitoring for manual action at 1306 and/or monitors for an indication either GCB is in an open configuration at 1308, until manual action is detected or indication that both GCBs are open (one GCB associated with each engine is monitored). When manual action, such as flight deck switch activation is detected at 1306 or either GCBs are in open configuration at 1308, the controller exits failsafe state at operation 1312.

If the failsafe cycling protection is not enabled at 1304, the controller exits failsafe state and returns to normal operating state at operation 1312. The process terminates thereafter.

Thus, in some examples, if a controller powers up out of failsafe state, the controller checks the parameter which is internally recorded to determine whether failsafe cycling protection has been enabled—as an initial determinator to decide whether to exit the failsafe state. After that, the controller looks for a flight deck button push or status of GCBs (for the BPCU) to determine when to exit a failsafe state.

Figure 14:
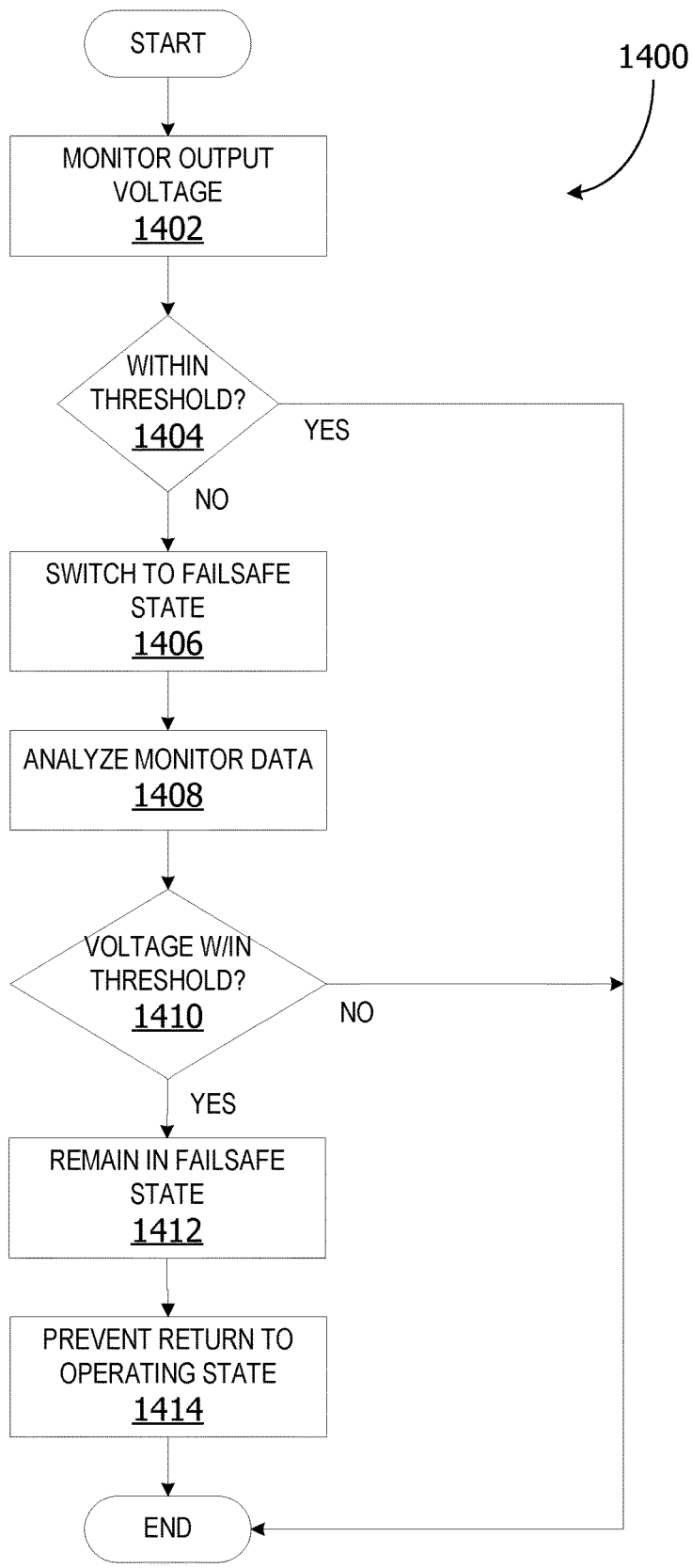
FIG. 14 is a flow chart illustrating an implementation of a failsafe cycling component providing anti-cycling protection.

FIG. 14 is a flow chart 1400 illustrating an implementation of a failsafe cycling component providing anti-cycling protection. In one implementation, the operations illustrated in FIG. 14 are performed, at least in part, by executing instructions by the one or more processors, such as, but not limited to, the processor 406 in FIG. 4.

At operation 1402, output voltage is monitored by a monitor component on the controller. A determination is made whether the output voltage is within a threshold at operation 1404. If no, the controller switches to failsafe state at operation 1406. Monitor data is analyzed at operation 1408. A determination is made whether the voltage returns to a value within a user-configurable threshold range at operation 1410. If yes, the failsafe cycling component remains in the failsafe state at operation 1412. The controller is preventing from returning to the operating state at operation 1414. The process terminates thereafter.

Figure 15:
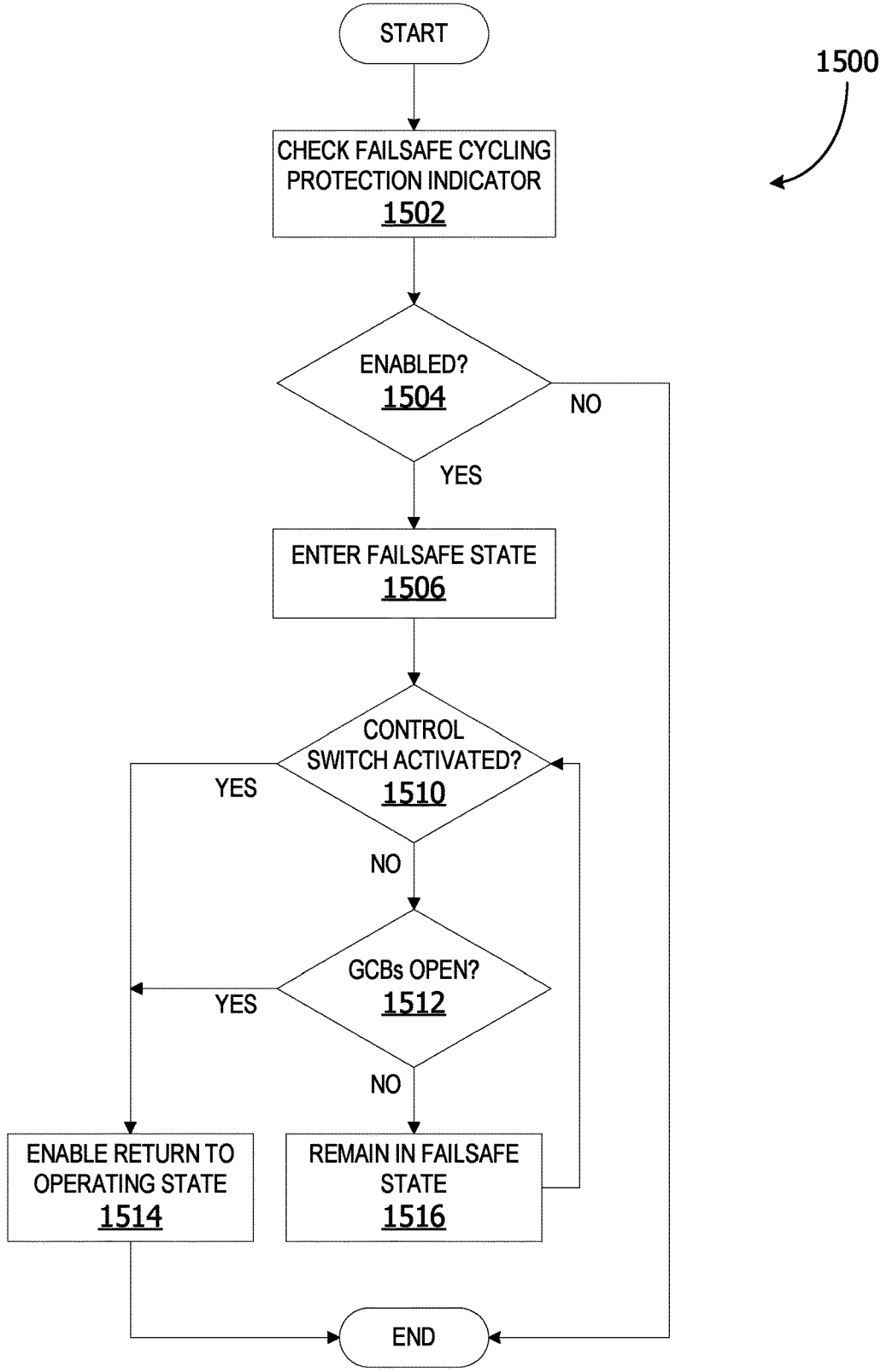
FIG. 15 is a flow chart illustrating an implementation of a failsafe cycling component enabling return to an operating state.

FIG. 15 is a flow chart 1500 illustrating an implementation of a failsafe cycling component enabling return to an operating state. In one implementation, the operations illustrated in FIG. 15 are performed, at least in part, by executing instructions by the one or more processors, such as, but not limited to, the processor 406 in FIG. 4.

At operation 1502, a failsafe cycling protection indicator is checked at power-up of the controller to determine whether failsafe cycling protection is enabled at operation 1504. If yes, the BPCU enters failsafe state at operation 1506. A determination is made whether a control switch is activated at operation 1510. If yes, the failsafe cycling component enables the BPCU to return to operating state at operation 1514.

If a control switch is not manually activated at operation 1510, a determination is made whether a generator circuit breaker (GCB) is open at operation 1512. If yes, the BPCU is enabled to return to operating state at operation 1514. The process terminates thereafter.

If the manual control switch is not activated and the circuit breakers are not open at operation 1512, the BPCU remains in the failsafe state at operation 1514. The system iteratively checks for manual activation of the control switch at 1510 and/or an indication a GCB is open at 1512. When manual control switch activation and/or a GCG(s) open, the system exits failsafe state and returns to operating state at 1514. The process terminates thereafter.

Figure 16:
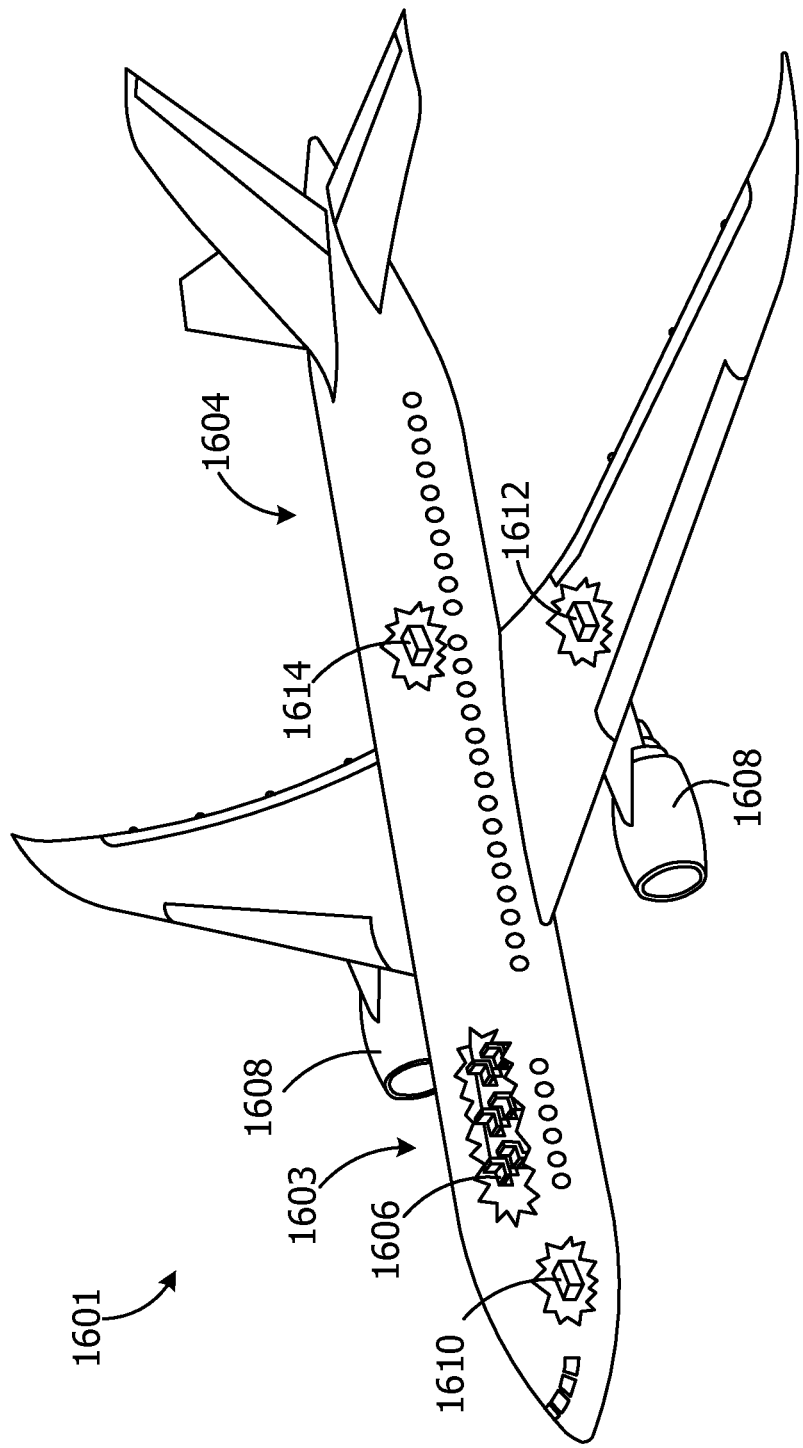
FIG. 16 is a schematic perspective view of an aircraft according to an implementation.

With reference now to FIG. 16, a more specific diagram of an aircraft 1600 is depicted in which an implementation of the disclosure is advantageously employed. In this example, the aircraft 1600 includes an airframe 1602 with a plurality of systems 1604 and an interior 1606. Implementations of the plurality of systems 1604 include one or more of a propulsion system 1608, an electrical system 1610, a hydraulic system 1612, and an environmental system 1614. However, other systems are also candidates for inclusion.

Although an aerospace example is shown, different advantageous implementations are applied to other industries, such as the automotive industry, etc.

Figure 17:
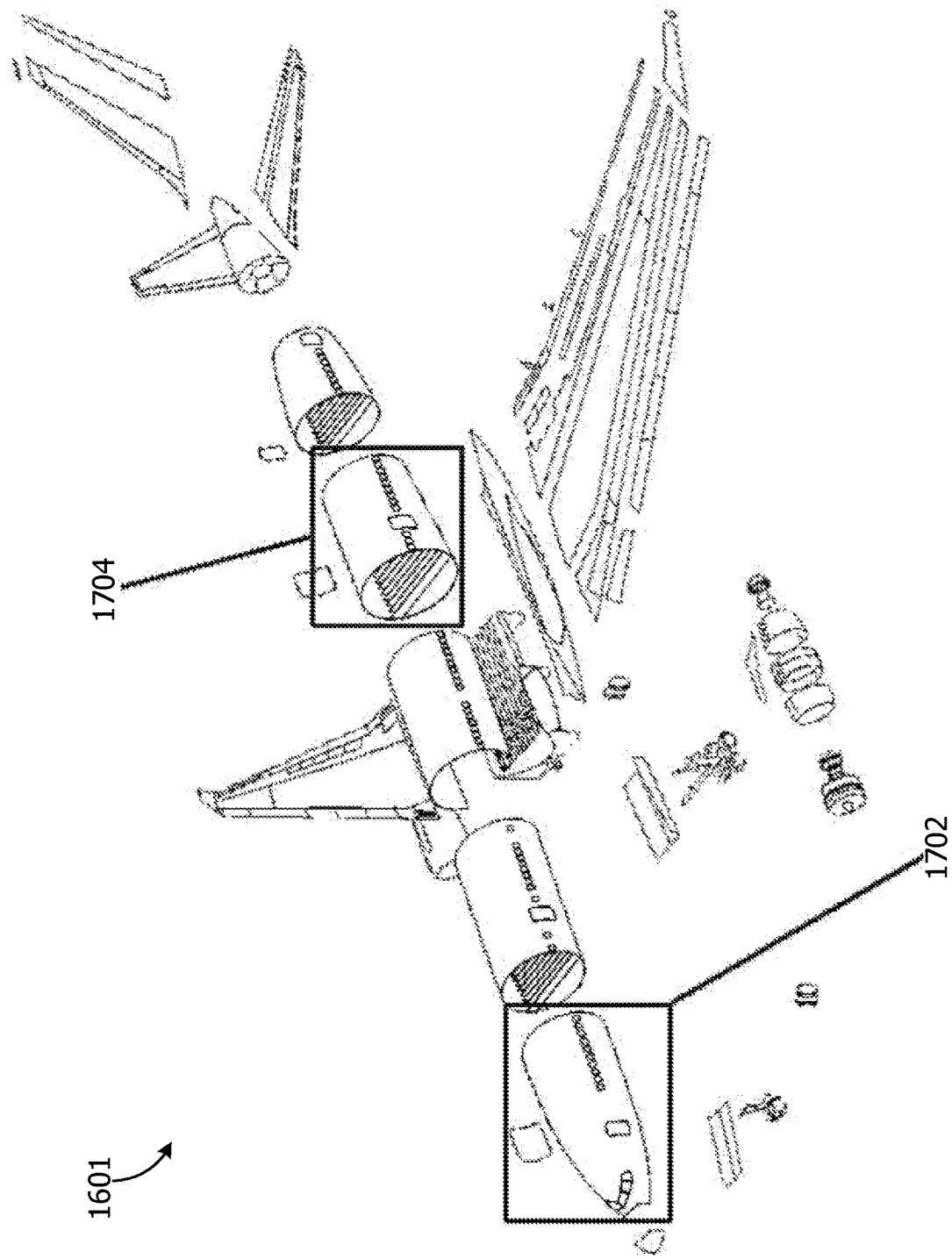
FIG. 17 is an exploded view of the aircraft of FIG. 16.

FIG. 17 is an exploded view of the aircraft 1600. The section 1702 of the aircraft 1600 is a forward section of including a set of BPCUs. In some examples, the forward section includes two BPCUs. The section 1704 includes a set of GCUs. In this example, the set of GCUs in the section 1704 includes six GCUs in which each GCU is associated with a generator.

The implementations disclosed herein are described in the general context of computer code or machine-useable instructions, including computer-executable instructions such as program components, being executed by a computer or other machine, such as a controller. Generally, program components including routines, programs, objects, components, data structures, and the like, refer to code that performs particular tasks, or implement particular abstract data types. The disclosed implementations are practiced in a variety of system configurations, including personal computers, laptops, smart phones, mobile tablets, hand-held devices, consumer electronics, specialty computing devices, etc. The disclosed implementations are also practiced in distributed computing environments, where tasks are performed by remote-processing devices that are linked through a communications network.

The illustrations of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

Thus, various examples prevent improper power cycle turn on and turn off of a power supply when the aircraft 100 is in the air. That is, the present disclosure prevents indeterministic behavior, namely preventing a controller from improperly detecting that the power supply has gone through a proper power cycle.

The following paragraphs describe further aspects of the disclosure:

A1. A system for failsafe cycling protection, the system comprising:
an aircraft electrical power system controller comprising a computer-readable medium storing instructions that are operative upon execution by a processor to:
switch from an operating state to a failsafe state responsive to detection of output voltage from a low voltage power source of the aircraft electrical power system controller outside an acceptable voltage threshold range, wherein the output voltage outside the acceptable threshold range indicates an undervoltage or an overvoltage;
inhibit the aircraft electrical power system controller returning to the operating state from the failsafe state at power up responsive to a failsafe cycling protection enabled; and
enable the aircraft electrical power system controller to return to the operating state from the failsafe state responsive to a manual activation of a control switch on a flight deck or detection of a set of generator control breakers in an open configuration.

A2. The system of claim 1, further comprising:
an internal flag in non-volatile memory, wherein the internal flag is set to a first configuration to indicate failsafe cycling protection is enabled, wherein the internal flag is set to a second configuration to indicate failsafe cycling protection is disabled.

A3. The system of claim 1, further comprising:
a hardware electronic latch, wherein failsafe cycling protection is enabled when the latch is in a set state, and wherein failsafe cycling protection is disabled when the latch is in a reset state.

A4. The system of claim 1, further comprising:
a counter value stored in a non-volatile memory on the aircraft electrical power system controller, wherein a failsafe cycling component determines whether to permit the aircraft electrical power system controller to switch from the failsafe state to the operating state based on the counter value.

A5. The system of claim 1, wherein the instructions are further operative to:
enable failsafe cycling protection of the aircraft electrical power system controller when a failsafe cycling component associated with the aircraft electrical power system controller detects air mode and a generator speed of at least one generator exceeds 400 Hz.

A6. The system of claim 1, wherein the aircraft electrical power system controller is a BPCU, and wherein the instructions are further operative to:
enable the BPCU to exit the failsafe state and return to the operating state responsive to activation of a forward external power switch or power-up with a first generator control breaker or a second generator control breaker in an open configuration.

A7. The system of claim 1, wherein the aircraft electrical power system controller is an auxiliary GCU, and wherein the instructions are further operative to:
enable failsafe cycling protection of the GCU with a parameter written to internal NVM responsive to a failsafe cycling component associated with the GCU detects air mode, a generator speed of at least one generator exceeds 400 Hz and the auxiliary power unit (APU) associated with the GCU operating.

A8. A method of failsafe cycling protection, the method comprising:
switching, by a failsafe cycling component, an aircraft electrical power system controller from an operating state to a failsafe state responsive to detection of output voltage from a low voltage power source of the aircraft electrical power system controller outside an acceptable voltage threshold range, wherein the output voltage outside the acceptable threshold range indicates an undervoltage or an overvoltage;
preventing return to the operating state when failsafe cycling protection is enabled; and
enabling the aircraft electrical power system controller to return to the operating state from the failsafe state responsive to detecting a manual activation of a control switch on a flight deck or detection of a set of generator control breakers in an open configuration.

A9. The method of claim 8, further comprising:
setting an internal flag in non-volatile memory to a first configuration to indicate failsafe cycling protection is enabled, wherein the internal flag is set to a second configuration to indicate failsafe cycling protection is disabled.

A10. The method of claim 8, further comprising:
engaging a hardware electronic latch in a set state to enable failsafe cycling protection, and wherein failsafe cycling protection is disabled when the latch is in a reset state.

A11. The method of claim 8, further comprising:
monitoring a failsafe cycling parameter indicating whether failsafe cycling protection is enabled; and
preventing the controller from exiting failsafe state based on a value of the failsafe cycling parameter.

A12. The method of claim 8, wherein the aircraft electrical power system controller is a BPCU, and further comprising:
permitting the BPCU to exit the failsafe state and return to the operating state responsive to detecting activation of a forward external power switch.

A13. The method of claim 8, wherein the aircraft electrical power system controller is a BPCU, and further comprising:
permitting the BPCU to exit the failsafe state and return to the operating state responsive to detecting a first generator control breaker and a second generator control breaker in an open configuration.

A14. The method of claim 8, further comprising:
enabling failsafe cycling protection of the aircraft electrical power system controller with a parameter written to internal NVM responsive to detecting an air mode of an aircraft associated with the aircraft electrical power system controller, a generator speed of at least one generator exceeds 400 Hz, and the auxiliary power unit (APU) associated with the GCU is activated.

A15. The method of claim 8, wherein the aircraft electrical power system controller is a GCU, and further comprising:
detecting a manual activation of a generator power switch associated with a flight deck; and
returning the GCU to the operating state from the failsafe state.

A16. An electrical power system controller, further comprising:
a failsafe cycling protection indicator having a first configuration to indicate failsafe cycling protection is enabled and a second configuration to indicate failsafe cycling protection is disabled;
an internal low voltage power source generates an output voltage;
a monitor component switches the electrical power system controller from an operating state to a failsafe state responsive to detection of the low voltage power source generating the output voltage outside an acceptable voltage threshold range, wherein the output voltage outside the acceptable threshold range indicates an undervoltage or an overvoltage; and
a failsafe cycling component, implemented on at least one processor, inhibits the aircraft electrical power system controller returning to the operating state from the failsafe state at power up responsive to failsafe cycling protection enabled.

A17. The electrical power system controller of claim 16, wherein the failsafe cycling protection indicator is a parameter in NVM.

A18. The electrical power system controller of claim 16, wherein the failsafe cycling protection indicator is a hardware electronic latch.

A19. The electrical power system controller of claim 16, wherein the failsafe cycling protection indicator comprises a counter in NVM on the aircraft electrical power system controller, and further comprising:
a counter value stored in the counter, wherein a failsafe cycling component determines whether to permit the aircraft electrical power system controller to switch from the failsafe state to the operating state based on the counter value.

A20. The electrical power system controller of claim 16, further comprising:
a failsafe cycling component that permits the aircraft electrical power system controllers to exit the failsafe state and return to the operating state responsive to manual activation of a control switch associated with a flight deck.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for failsafe cycling protection, the system comprising:
an aircraft electrical power system controller comprising a computer-readable medium storing instructions that are operative upon execution by a processor to:
switch from an operating state to a failsafe state responsive to detection of output voltage from a low voltage power source of the aircraft electrical power system controller outside an acceptable voltage threshold range including a minimum threshold and a maximum threshold, wherein the low voltage power source is to receive a low voltage direct current and create one or more lower level voltages to supply various circuitry, wherein the output voltage outside the acceptable voltage threshold range is to indicate both of an undervoltage or an overvoltage, and wherein if the output voltage falls below the minimum threshold an undervoltage is to be indicated, and if the output voltage exceeds the maximum threshold an overvoltage is to be indicated;
inhibit the aircraft electrical power system controller returning to the operating state from the failsafe state at power up responsive to detection of a failsafe cycling protection enabled, wherein the failsafe cycling protection assumes an intermittent failure in the low voltage power source; and
enable the aircraft electrical power system controller to return to the operating state from the failsafe state responsive to a manual activation of a control switch on a flight deck or detection of a set of generator control breakers in an open configuration.

2. The system of claim 1, further comprising:
an internal flag in non-volatile memory, wherein the internal flag is set to a first configuration to indicate failsafe cycling protection is enabled, wherein the internal flag is set to a second configuration to indicate failsafe cycling protection is disabled.

3. The system of claim 1, further comprising:
a hardware electronic latch, wherein failsafe cycling protection is enabled when the latch is in a set state, and wherein failsafe cycling protection is disabled when the latch is in a reset state.

4. The system of claim 1, further comprising:
a counter value stored in a non-volatile memory on the aircraft electrical power system controller, wherein a failsafe cycling component determines whether to permit the aircraft electrical power system controller to switch from the failsafe state to the operating state based on the counter value.

5. The system of claim 1, wherein the instructions are further operative to:
enable failsafe cycling protection of the aircraft electrical power system controller when a failsafe cycling component associated with the aircraft electrical power system controller detects air mode and a generator speed of at least one generator exceeds 400 Hz.

6. The system of claim 1, wherein the aircraft electrical power system controller is a bus power control unit (BPCU), and wherein the instructions are further operative to:
enable the BPCU to exit the failsafe state and return to the operating state responsive to activation of a forward external power switch or power up with a first generator control breaker or a second generator control breaker in an open configuration.

7. The system of claim 1, wherein the aircraft electrical power system controller is an auxiliary generator control unit (GCU), and wherein the instructions are further operative to:
enable failsafe cycling protection of the GCU with a parameter written to internal non-volatile memory (NVM) responsive to a failsafe cycling component associated with the GCU detects air mode, a generator speed of at least one generator exceeds 400 Hz and an auxiliary power unit (APU) associated with the GCU is operating.

8. A method of failsafe cycling protection, the method comprising:
switching, by a failsafe cycling component, an aircraft electrical power system controller from an operating state to a failsafe state responsive to detection of output voltage from a low voltage power source of the aircraft electrical power system controller outside an acceptable voltage threshold range including a minimum threshold and a maximum threshold, wherein the low voltage power source is to receive a low voltage direct current and create one or more lower level voltages to supply various circuitry, wherein the output voltage outside the acceptable voltage threshold range is to indicate both of an undervoltage or an overvoltage, and wherein if the output voltage falls below the minimum threshold an undervoltage is to be indicated, and if the output voltage exceeds the maximum threshold an overvoltage is to be indicated;
preventing, by the failsafe cycling component, return to the operating state when failsafe cycling protection is enabled, wherein the failsafe cycling component assumes an intermittent failure in the low voltage power source; and enabling, by the failsafe cycling component, the aircraft electrical power system controller to return to the operating state from the failsafe state responsive to detecting a manual activation of a control switch on a flight deck or detection of a set of generator control breakers in an open configuration.

9. The method of claim 8, further comprising:
setting an internal flag in non-volatile memory to a first configuration to indicate failsafe cycling protection is enabled, wherein the internal flag is set to a second configuration to indicate failsafe cycling protection is disabled.

10. The method of claim 8, further comprising:
engaging a hardware electronic latch in a set state to enable failsafe cycling protection, and wherein failsafe cycling protection is disabled when the latch is in a reset state.

11. The method of claim 8, further comprising:
monitoring a failsafe cycling parameter indicating whether failsafe cycling protection is enabled; and
preventing the aircraft electrical power system controller from exiting failsafe state based on a value of the failsafe cycling parameter.

12. The method of claim 8, wherein the aircraft electrical power system controller is a bus power control unit (BPCU), and further comprising:
permitting the BPCU to exit the failsafe state and return to the operating state responsive to detecting activation of a forward external power switch.

13. The method of claim 8, wherein the aircraft electrical power system controller is a BPCU, and further comprising:
permitting the BPCU to exit the failsafe state and return to the operating state responsive to detecting a first generator control breaker and a second generator control breaker in an open configuration.

14. The method of claim 8, further comprising:
enabling failsafe cycling protection of the aircraft electrical power system controller with a parameter written to internal non-volatile memory (NVM) responsive to detecting an air mode of an aircraft associated with the aircraft electrical power system controller, a generator speed of at least one generator exceeds 400 Hz, and at least one auxiliary power unit (APU) associated with the aircraft electrical power system controller is activated.

15. The method of claim 8, wherein the aircraft electrical power system controller is a generator control unit (GCU), and further comprising:
detecting a manual activation of a generator power switch associated with a flight deck; and
returning the GCU to the operating state from the failsafe state.

16. An electrical power system controller comprising:
a failsafe cycling protection indicator having a first configuration to indicate failsafe cycling protection is enabled and a second configuration to indicate failsafe cycling protection is disabled;
an internal low voltage power source generates an output voltage, wherein the low voltage power source is to receive a low voltage direct current and create one or more lower level voltages to supply various circuitry;
a monitor component switches the electrical power system controller from an operating state to a failsafe state responsive to detection of the low voltage power source generating the output voltage outside an acceptable voltage threshold range including a minimum threshold and a maximum threshold, wherein the output voltage outside the acceptable voltage threshold range is to indicate both of an undervoltage or an overvoltage, and wherein if the output voltage falls below the minimum threshold an undervoltage is to be indicated, and if the output voltage exceeds the maximum threshold an overvoltage is to be indicated; and a failsafe cycling component, implemented on at least one processor, inhibits the electrical power system controller returning to the operating state from the failsafe state at power up responsive to detection of failsafe cycling protection enabled, wherein the failsafe cycling protection assumes an intermittent failure in the low voltage power source.

17. The electrical power system controller of claim 16, wherein the failsafe cycling protection indicator is a parameter in non-volatile memory (NVM).

18. The electrical power system controller of claim 16, wherein the failsafe cycling protection indicator is a hardware electronic latch.

19. The electrical power system controller of claim 16, wherein the failsafe cycling protection indicator comprises a counter in non-volatile memory (NVM) on the aircraft electrical power system controller, and further comprising:

a counter value stored in the counter, wherein a failsafe cycling component determines whether to permit the electrical power system controller to switch from the failsafe state to the operating state based on the counter value.

20. The electrical power system controller of claim 16, further comprising:

a failsafe cycling component that permits the electrical power system controller to exit the failsafe state and return to the operating state responsive to manual activation of a control switch associated with a flight deck.

* * * * *